US008494570B2

(12) United States Patent
Kim et al.

(10) Patent No.: US 8,494,570 B2
(45) Date of Patent: Jul. 23, 2013

(54) METHOD FOR ALLOCATING CONTROL CHANNELS

(75) Inventors: Jeong Ki Kim, Anyang-si (KR); Ki Seon Ryu, Seongnam-si (KR); Young Soo Yuk, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/865,382

(22) PCT Filed: Jan. 29, 2009

(86) PCT No.: PCT/KR2009/000432
§ 371 (c)(1),
(2), (4) Date: Sep. 22, 2010

(87) PCT Pub. No.: WO2009/096714
PCT Pub. Date: Aug. 6, 2009

(65) Prior Publication Data
US 2011/0009143 A1    Jan. 13, 2011

Related U.S. Application Data

(60) Provisional application No. 61/024,521, filed on Jan. 29, 2008.

(30) Foreign Application Priority Data

Mar. 14, 2008  (KR) ........................ 10-2008-0024079
Apr. 28, 2008  (KR) ........................ 10-2008-0039528

(51) Int. Cl.
*H04W 72/00*  (2009.01)
*H04B 15/00*  (2006.01)

(52) U.S. Cl.
USPC ........ 455/509; 455/450; 455/451; 455/452.1; 455/452.2

(58) Field of Classification Search
USPC ............................... 455/509, 525, 550.1, 507
See application file for complete search history.

(56) References Cited

U.S. PATENT DOCUMENTS

| | | | | |
|---|---|---|---|---|
| 7,286,842 | B2 * | 10/2007 | Li et al. ........................ | 455/502 |
| 8,036,225 | B1 * | 10/2011 | Pawar et al. ............ | 370/395.21 |
| 8,125,949 | B1 * | 2/2012 | Dinan et al. .................. | 370/329 |
| 8,130,702 | B2 * | 3/2012 | Mohanty et al. .............. | 370/328 |
| 8,311,025 | B2 * | 11/2012 | Lin et al. ....................... | 370/343 |
| 2006/0018269 | A1 | 1/2006 | Agrawal et al. | |
| 2007/0265016 | A1 | 11/2007 | Kahtava et al. | |
| 2008/0049690 | A1 * | 2/2008 | Kuchibhotla et al. ........ | 370/338 |
| 2008/0095100 | A1 * | 4/2008 | Cleveland et al. ............ | 370/328 |
| 2008/0130486 | A1 * | 6/2008 | Lim et al. ...................... | 370/210 |
| 2009/0169807 | A1 * | 7/2009 | Yang et al. .................... | 428/119 |
| 2010/0272042 | A1 * | 10/2010 | Chun et al. .................... | 370/329 |
| 2011/0158192 | A1 * | 6/2011 | Kim et al. ..................... | 370/329 |
| 2011/0205905 | A1 * | 8/2011 | Kang et al. .................... | 370/241 |

OTHER PUBLICATIONS

Y. Yuk et al., "Subframe Control Channels of IEEE 802.16m Systems," IEEE 802.16 Broadband Wireless Access Working Group, Doc. No. C80216m_08/149, Mar. 2008.

* cited by examiner

*Primary Examiner* — Tilahun B Gesesse
(74) *Attorney, Agent, or Firm* — Lee, Hong, Degerman, Kang & Waimey

(57) ABSTRACT

A frame structure used in a wireless access system and a method for allocating uplink control channels are provided. The method transmits a super-MAP including information regarding a control channel allocation method and control channel allocation information to a receiving end and receives a control signal through an uplink subframe indicated by the control channel allocation information using the control channel allocation method. Thus, the transmitting end can correctly allocate a control channel for each downlink burst.

20 Claims, 20 Drawing Sheets

METHOD FOR ALLOCATING CONTROL CHANNELS

CROSS-REFERENCE TO RELATED APPLICATIONS

This application is the National Stage filing under 35 U.S.C. 371 of International Application No. PCT/KR2009/000432 filed on Jan. 29, 2009, which claims the benefit of earlier filing date and right of priority to Korean Application Nos. 10-2008-0039528, filed Apr. 28, 2008, and 10-2008-0024079, filed Mar. 14, 2008, and also claims the benefit of U.S. Provisional Application No. 61/024,521, filed Jan. 29, 2008, the contents of which are all incorporated by reference herein in their entirety.

TECHNICAL FIELD

The present invention relates to a frame structure used in a wireless access system and a method for allocating uplink control channels.

BACKGROUND ART

The following is a description of a general frame structure used in a wireless access system.

FIG. 1 illustrates a frame structure used in a broadband wireless access system (for example, IEEE 802.16).

A horizontal axis of a frame structure shown in FIG. 1 represents an Orthogonal Frequency Division Multiple Access (OFDMA) symbol number and a vertical axis represents a subchannel (i.e., frequency unit) logical number. In FIG. 1, one frame is defined as a data sequence channel having a predetermined period of time in terms of physical characteristics. That is, one frame is divided into one downlink subframe and one uplink subframe. The downlink subframe and the uplink subframe are separated by a Transmit Transition Gap (TTG) and frames are separated by a Receive Transition Gap (RTG).

Here, the downlink subframe may include a preamble, a Frame Control Header (FCH), a downlink MAP (DL-MAP), an uplink MAP (UL-MAP), and one or more data bursts. The uplink subframe may include one or more uplink data bursts and a ranging subchannel.

In FIG. 1, the preamble is specific sequence data located at a first symbol of each frame and is used for synchronization of a terminal or Mobile Station (MS) with a base station or for channel estimation. The FCH is used to provide DL-MAP-related channel allocation information and channel code information. The DL-MAP/UL-MAP is a Medium Access Control (MAC) message used to notify a terminal of channel resource allocation in uplink/downlink. The data burst is a unit of data for transmission from a base station to a terminal or from a terminal to a base station.

A Downlink Channel Descriptor (DCD) that can be used in the frame structure of FIG. 1 is a MAC message used for notification of physical characteristics in a downlink channel and an Uplink Channel Descriptor (UCD) is a MAC message used for notification of physical characteristics in an uplink channel.

In the case of downlink, the terminal detects a preamble transmitted from the base station to achieve synchronization with the base station as shown in FIG. 1. Then, the terminal can decode the DL-MAP using information obtained from the FCH. The base station can transmit scheduling information for downlink or uplink resource allocation to the terminal every frame (for example, 5 ms) using the DL-MAP or UL-MAP message.

The following is a description of a general data transmission method for a transmitting end and a receiving end.

In the data transmission method, when the receiving end has failed to receive data transmitted from the transmitting end, the receiving end requests that the transmitting end retransmit the same data. One general data retransmission method is an Automatic Repeat reQuest (ARQ) scheme.

In the ARQ scheme, after the receiving end receives data, the receiving end notifies the transmitting end of whether or not the receiving end has successfully received the data through an Acknowledgement (ACK) or Non-Acknowledgement (NACK) signal and the transmitting end retransmits corresponding data when a NACK signal is received. The ARQ scheme is divided into Stop-And-Wait (SAW) ARQ, Go-Back-N (GBN) ARQ, Selective-Repeat (SR) ARQ schemes.

In the case where the SAW ARQ scheme is used, the transmitting end waits until an ACK or NACK signal is received after transmitting data. The transmitting end transmits next data when receiving an ACK signal and transmits previous data when receiving a NACK signal. That is, in the SAW ARQ scheme in which the transmitting end transmits one frame at once, the transmitting end transmits a next frame after confirming that a frame has been successfully transmitted.

In the GBN ARQ scheme, the transmitting end continually transmits data, regardless of a response message. Specifically, in the case where the receiving end has failed to receive data of a specific frame, the receiving end does not transmit an ACK signal of the specific frame to the transmitting end. Since the transmitting end fails to receive an ACK signal of the specific frame, the transmitting end retransmits data, starting from data of the specific frame.

In the SR ARQ scheme, when the transmitting end has received a NACK signal while continually transmitting data, the transmitting end retransmits only data corresponding to the NACK signal. Specifically, when the receiving end has failed to receive data of a specific frame, the receiving end transmits a NACK signal to the transmitting end. When the transmitting end has received a NACK signal, the transmitting end retransmits data of a frame indicated by the NACK signal to the receiving end, thereby transmitting all data. Implementation of the SR ARQ scheme may be relatively complex since each frame should be individually managed by assigning a sequence number to each frame.

The data transmission rate required in the scheme in which data is transmitted in a packet format has increased as communication technologies have improved. Accordingly, a coding rate or a modulation method of a level corresponding to the high data rate has also been applied to the communication system in order to prevent errors occurring in high-speed transmission environments. In addition, there has been a need to provide an ARQ scheme suitable for high-speed transmission environments. Thus, a Hybrid ARQ (HARQ) scheme has been suggested.

In the ARQ scheme, information is discarded when an error occurs in the information. However, in the HARQ scheme, the receiving end stores information in which an error has occurred in a buffer and then combines the stored information with information for retransmission to apply Forward Error Correction (FEC). That is, the HARQ scheme can be considered a combination of the ARQ scheme with FEC. HARQ can be mainly divided into the following four types.

In the first type of HARQ scheme, the receiving end always checks an error detection code included in data to preferentially apply the FEC scheme. When a received packet contains an error, the receiving end requests retransmission of the received packet to the transmitting end. The receiving end discards the erroneous packet and the transmitting end uses the same FEC code as that of the discarded packet to retransmit the packet.

The second type of HARQ scheme is referred to as an "Incremental Redundancy (IR) ARQ scheme". In the second type of HARQ scheme, the receiving end stores an initially transmitted packet in a buffer without discarding the packet and then combines the stored packet with retransmitted redundancy bits. During retransmission, the transmitting end retransmits only parity bits excluding data bits. The transmitting end uses different parity bits every retransmission.

The third type of HARQ scheme is a special case of the second type. Each packet is self-decodable. When the transmitting end performs retransmission, the transmitting end retransmits constructs and retransmits a packet including both data and an erroneous portion. Although this scheme enables more correct decoding than the second type, the efficiency of coding gain is low.

The fourth type of HARQ scheme provides a function to store data initially received by the receiving end and combine the stored data with retransmitted data in addition to the functions of the first type. The fourth type of HARQ scheme is also referred to as "metric combining" or "chase combining". The fourth HARQ type has an excellent Signal to Interference Noise Ratio (SINR) and always uses the same parity bits of data to be retransmitted.

When an error has occurred or data has been lost during data transmission, the above data retransmission methods enable reconstruction of original data using the above schemes.

FIG. 2 illustrates example HARQ control signal delay during general downlink data transmission.

As shown in FIG. 2, a base station can notify a terminal of downlink burst information of the current frame by sending a DL-MAP to the terminal in a frame (for example, an Nth frame) in a broadband wireless access system (for example, WiMAX). Accordingly, the terminal can receive downlink data burst from the base station in the Nth frame (S0101).

In addition, the base station can notify the terminal of information of an uplink channel for transmitting a control signal (for example, an ACK signal) by sending a UL-MAP to the terminal in the Nth frame. Accordingly, when HARQ is applied, the terminal can transmit an ACK/NACK signal for the downlink data burst to the base station in the N+1th frame (S0102).

DISCLOSURE

Technical Problem

The DL-MAP/UL-MAP message described above with reference to FIG. 1 may cause unnecessary MAP message overhead since the message is transmitted according to a Modulation Coding Scheme (MCS) level that can be received by all terminals as described above. For example, since terminals near the base station are in good channel conditions, the terminals use a high MCS level (for example, QPSK 1/2) in order to encode and decode the message. However, without taking into consideration these circumstances, the base station will transmit a MAP message by encoding the message according to a low MCS level (for example, QPSK 1/12) for terminals located at the edges of the cell. Accordingly, each terminal should always receive a message encoded according to the same MCS level regardless of the channel conditions. This may cause unnecessary MAP message overhead.

In the case of FIG. 2, HARQ ACK delay of at least one frame may occur. In addition, when a NACK has occurred, retransmission delay may be increased due to processing delay at the base station. That is, the frame structure generally used in the communication system (for example, the IEEE 802.16e system) undergoes fixed ACK delay for downlink bursts.

When a new frame structure and MAP message is designed to reduce such control information delay, it is not possible to use the conventional control channel allocation method without change since, if the conventional control channel allocation method is applied without change to the new frame structure, the base station cannot correctly control the control channels since the frame structure is different. Accordingly, it is desirable to define a new control channel allocation method according to the new frame structure.

An object of the present invention devised to solve the problems lies on providing a new frame structure and a new MAP message.

Another object of the present invention devised to solve the problem lies on providing a control channel allocation method and an uplink resource allocation method using a new frame structure and a new MAP message to enable efficient data transmission.

Technical Solution

The present invention provides a frame structure used in a wireless access system to achieve the above and other objects. The present invention also suggests methods for allocating uplink control channels.

In an aspect of the present invention, provided herein is a method for allocating control channels in a wireless access system, the method including transmitting a super-MAP including information regarding a control channel allocation method and control channel allocation information to a receiving end; and receiving a control signal through an uplink subframe indicated by the control channel allocation information. Here, the control channel allocation information may include information indicating whether the control channel is located at a current frame or a next frame, and information indicating an uplink subframe at which the control channel is located among uplink subframes included in the current frame or the next frame.

The method may further include transmitting, when the control channel allocation information is changed, a super-MAP including changed control channel allocation information to the receiving end. Here, the control channel allocation information may be changed on a superframe basis.

The method may further include transmitting, when the control channel allocation information is changed, a frame MAP including changed control channel allocation information and scope information indicating a frame scope in which the changed control channel allocation information is maintained to the receiving end. Here, the control channel allocation information may be changed on a frame basis.

In addition, the changed control channel allocation information may include information of a frame at which a changed control channel is located and information of an uplink subframe at which a changed control channel is located.

In addition, the changed control channel allocation information may include an identifier of a downlink subframe at which the control channel has been changed, information of a frame at which the changed control channel for the downlink subframe is located, and information of an uplink subframe at which the changed control channel is located The method may further include transmitting, when the control channel allocation information is changed, a sub-MAP including changed control channel allocation information and scope information indicating a subframe scope in which the changed control channel allocation information is maintained to the receiving end. Here, the control channel allocation information may be changed on a subframe basis.

In addition, the changed control channel allocation information may include information of a frame at which a changed control channel is located and information of an uplink subframe at which a changed control channel is located.

In addition, the information of the frame at which the changed control channel is located may indicate only a frame in which the sub-MAP has been transmitted.

The method may further include transmitting a message including control channel allocation information of a first uplink subframe and a last uplink subframe to the receiving end.

The uplink subframe may be one of a plurality of uplink subframes included in a specific frame included in a superframe.

In another aspect of the present invention, provided herein is a method for allocating control channels in a wireless access system, the method including receiving a first super-MAP including information regarding a control channel allocation method and control channel allocation information to a receiving end, and transmitting a control signal through an uplink subframe at which a control channel indicated by the control channel allocation information is located.

The method may further include receiving a second super-MAP including changed control channel allocation information. Here, the second super-MAP may be received on a superframe basis.

The method may further include receiving a sub-MAP including changed control channel allocation information and scope information indicating a subframe scope in which the changed control channel allocation information is maintained. Here, the sub-MAP may be received on a frame basis.

The method may further include receiving a sub-MAP including changed control channel allocation information and scope information indicating a subframe scope in which the changed control channel allocation information is maintained to the receiving end. Here, the sub-MAP may be received on a subframe basis.

Advantageous Effects

The present invention has the following advantages.

First, it is possible to reduce delay of control information using a frame structure and MAP message defined in the present invention.

Second, use of the frame structure defined in the present invention enables efficient control such that all subframes have the same control information delay. Accordingly, the base station can correctly allocate a control channel for each downlink burst.

Third, using the method suggested in the present invention can efficiently reduce overhead of a MAP message such as a super-MAP or a sub-MAP.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
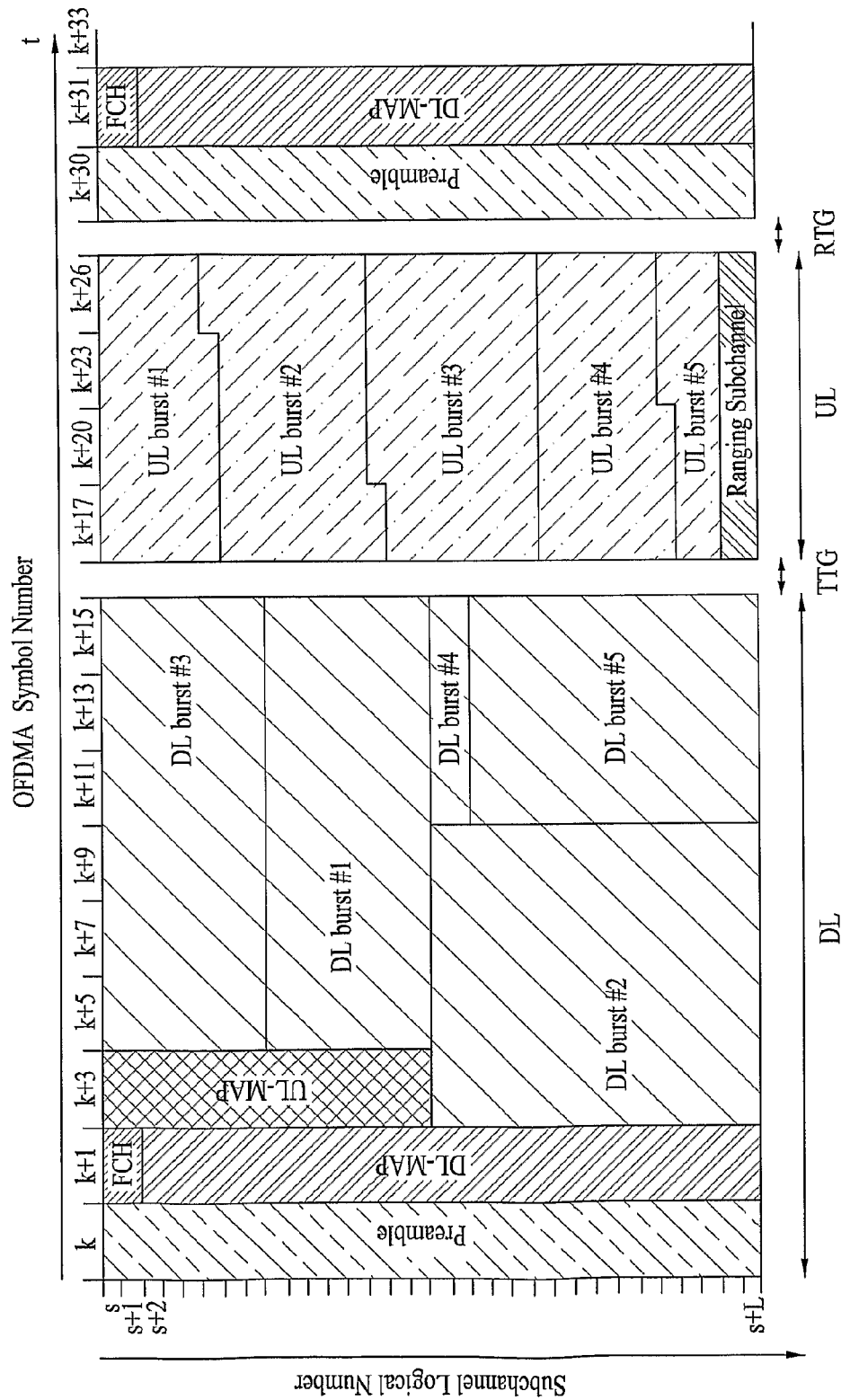
FIG. 1 illustrates a frame structure used in a broadband wireless access system (for example, IEEE 802.16).
Figure 2:
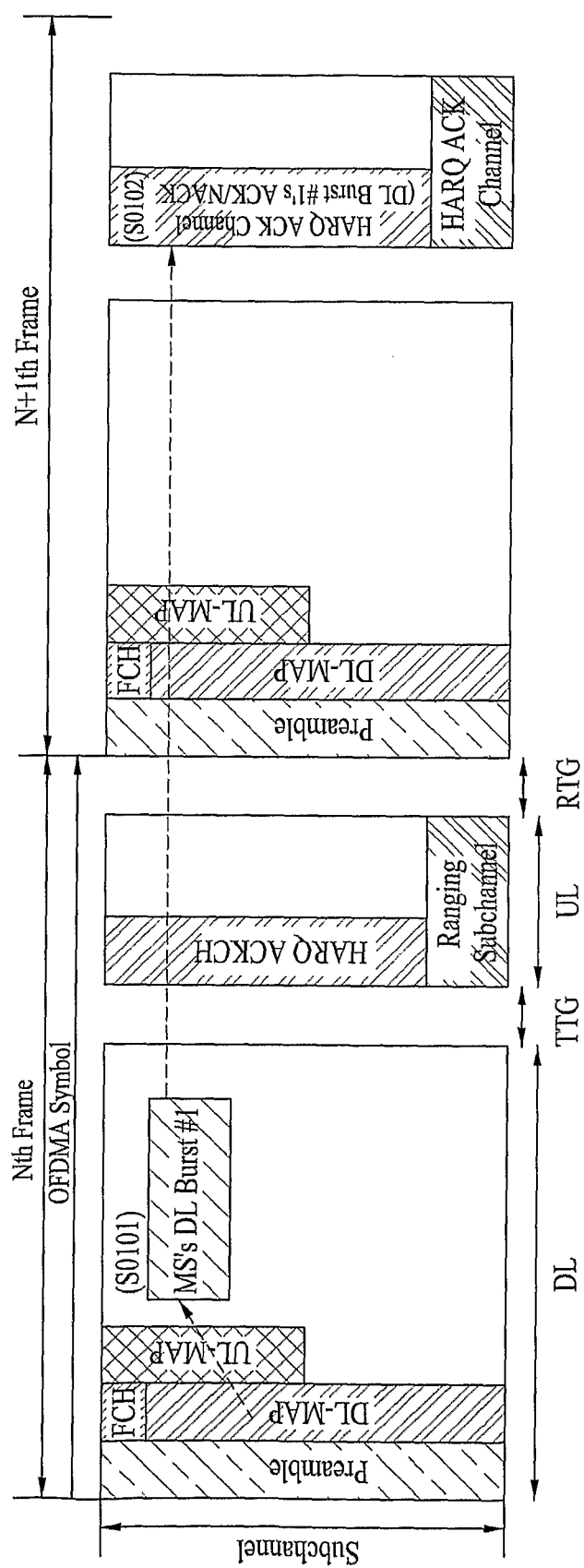
FIG. 2 illustrates example HARQ control signal delay during general downlink data transmission.

The present invention provides a frame structure used in a wireless access system and a method for allocating uplink control channels to overcome the above and other objects.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

The embodiments of the present invention will be described focusing on the data communication relationship between a terminal and a Base Station (BS). Here, the BS is a terminal node in a network which performs communication directly with the terminal. Specific operations which will be described as being performed by the BS may also be performed by an upper node above the BS as needed.

That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile terminal" or "mobile subscriber station (MSS)".

Although the term "transmitting end" in the embodiments of the present invention refers to a base station, the term may also refer to a terminal that performs the same functions. In addition, although the term "receiving end" in the embodiments refers to a terminal or Mobile Station (MS), the term may also refer to a base station that performs the same functions.

The embodiments of the present invention can be implemented through a variety of means. For example, the embodiments of the present invention can be implemented by hardware, firmware, software, or any combination thereof.

In the case where the present invention is implemented by hardware, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, methods according to the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by at least one of P802.16-2004, P802.16e-2005, and P802.16Rev2 documents which are standard documents of the IEEE 802.16 system.

Specific terms used in the following description are provided for better understanding of the present invention and can be replaced with other terms without departing from the spirit of the present invention.

For example, one frame may include one or more downlink (DL) subframes and one or more uplink (UL) subframes. Here, each of the DL subframes can be referred to as a "DL mini-frame". In addition, each of the DL subframes can be referred to as a "UL mini-frame".

Reference will now be made in detail to the preferred embodiments of the present invention, examples of which are illustrated in the accompanying drawings.

Figure 3:
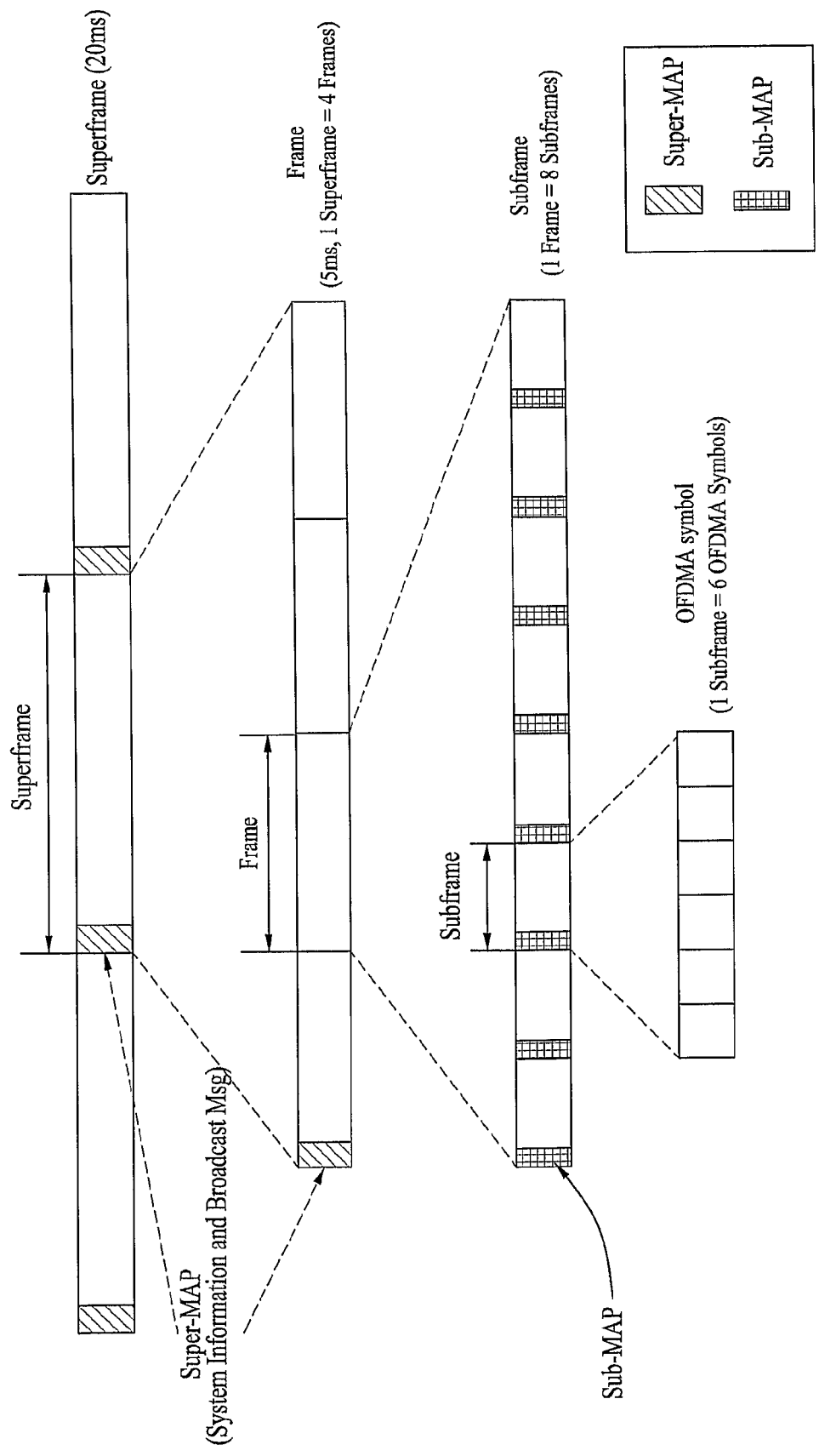
FIG. 3 illustrates a new frame structure used in the embodiments of the present invention.

FIG. 3 illustrates a new frame structure used in the embodiments of the present invention.

As shown in FIG. 3, one superframe may include one or more frames and one frame may include one or more subframes. In addition, one subframe may include one or more OFDMA symbols.

The individual length and the number of superframes, frames, subframes, and symbols can be adjusted according to user requirements or system environments. The term "subframe" used in the embodiments of the present invention refers to any lower-level frame structure generated by dividing one frame on a specific length basis.

In FIG. 3, it is assumed that the length of a superframe is 20 ms and the length of a frame is 5 ms. That is, one superframe may include 4 frames. In addition, one frame may have a frame structure including 8 subframes. Here, one subframe may include 6 OFDMA symbols. Of course, these specific values can be changed according to channel environments.

In FIG. 3, a superframe MAP is present at the beginning of each superframe. The superframe MAP can be referred to as a "super-MAP" or a "superframe header (SFH)". However, the superframe MAP will be referred to as a "super-MAP" in the embodiments of the present invention. In addition, a subframe MAP is present at the beginning of each subframe. The subframe MAP can be referred to as a "sub-MAP". The sub-MAP includes a downlink (DL) sub-MAP and an uplink (UL) sub-MAP.

Figure 4:
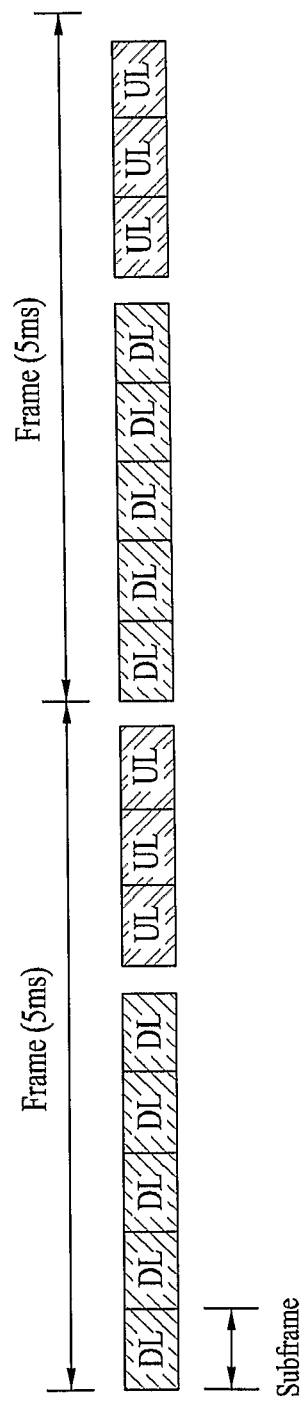
FIG. 4 illustrates the configurations of DL subframes and UL subframes in a Time Division Duplexing (TDD) system according to an embodiment of the present invention.

FIG. 4 illustrates the configurations of DL subframes and UL subframes in a Time Division Duplexing (TDD) system according to an embodiment of the present invention.

Specifically, FIG. 4 illustrates a subframe structure with different numbers of DL subframes and UL subframes. Here, the ratio of the number of DL subframes to the number of UL subframes is set to 5:3 as shown in FIG. 4. That is, when one frame includes 8 subframes, one frame may include 5 DL subframes and 3 UL subframes.

Accordingly, it is possible to define a new method for allocating a control channel for a DL burst in a subframe structure suggested in the present invention. The transmitting end can provide allocation information of a control channel of a DL subframe through one of the super-MAP and the sub-MAP.

The method for allocating a control channel employed in the present invention includes static allocation, semi-static allocation, and dynamic allocation. A method for allocating an ACK channel as an example of the control channel will be described in the embodiments of the present invention. Of course, the spirit of the present invention can be applied to any control channel other than the ACK channel.

The following Table 1 illustrates an example format of ACK allocation information that can be included in a super-MAP used in the embodiments of the present invention.

TABLE 1

| Name | Size | Values |
|------|------|--------|
| HARQ ACK/ NACK Allocation | 2 bits | 0b00: static allocation<br>0b01: semi-static allocation<br>0b10: dynamic allocation<br>0b11: reserved |
| ACKCH location | 16 bits | This indicates the location of an ACK channel for a DL subframe.<br>ACK allocation information can be expressed in bitmap form. Here, 3 bits for each DL subframe indicate a corresponding UL subframe.<br>That is, the 1st bit indicates whether the corresponding UL subframe is included in a current frame or a next frame and the other two bits indicate the ordinal of the corresponding UL subframe.<br>bit #0: A bit for 1st DL subframe, indicating whether ACK channel has been allocated to current frame(0b0) or next frame(0b1).<br>bit #1~2: Bits indicating the ordinal of the UL subframe in a frame corresponding to the 1st DL subframe (where the frame can be identified through bit #0).<br>0b00 - 1st UL subframe<br>0b01 - 2nd UL subframe<br>0b10 - 3rd UL subframe)<br>0b11- reserved<br>bit #3~5: Bits for 2nd DL subframe<br>bit #6~8: Bits for 3rd DL subframe<br>bit #9~11: Bits for 4th DL subframe<br>bit #12~14: Bits for 5th DL subframe<br>bit #15: reserved |

The HARQ ACK/NACK allocation field indicates the manner in which the control channel has been allocated. For example, the HARQ ACK/NACK allocation field indicates that static allocation is used when the field is set to '0b00' indicates that semi-static allocation is used when the filed is set to "0b01", and indicates that dynamic allocation is used when the field is set to '0b10'. Here, '0b11' is a reserved value.

The ACK channel allocation information (e.g. ACKCH Location) parameter indicates a UL subframe to which an HARQ ACK channel for the UL subframe has been allocated. In the embodiments of the present invention, the ACK channel allocation information may be constructed in a 16-bit bitmap structure including 3 repeated bits.

The first of the three bits in the bitmap structure may indicate whether an HARQ ACK channel for a corresponding DL subframe is located at the current frame (0b0) or is located at the next frame (0b1).

In Table 1, bits #0-2 indicate the allocation location of an ACK channel for the first DL subframe. More specifically, the bit #0 indicates whether the first UL subframe which is corresponded to the first DL subframe has been set to the current frame or the next frame. The bits #1-2 indicate the location of a UL subframe to which an ACK channel corresponding to the DL subframe has been allocated.

For example, the two information bits indicate that the ACK channel has been allocated to the first UL subframe when the bits are '0b00', indicate that the ACK channel has been allocated to the second UL subframe when the bits are '0b01', and indicate that the ACK channel has been allocated to the third UL subframe when the bits are '0b10'. Here, '0b11' is a reserved value. Of course, when the number of UL subframes is not 3, the bitmap can be adjusted according to the number of UL subframes. The remaining portion of the bitmap can be analyzed in this manner.

Accordingly, as shown in Table 1, bits #3-5 can indicate the allocation location of an ACK channel for the second DL subframe, bits #6-8 can indicate the allocation location of an ACK channel for the third DL subframe, bits #9-11 can indicate the allocation location of an ACK channel for the fourth DL subframe, and bits #12-14 can indicate the allocation location of an ACK channel for the fifth DL subframe. The last bit #15 is a reserved value.

Figure 5:
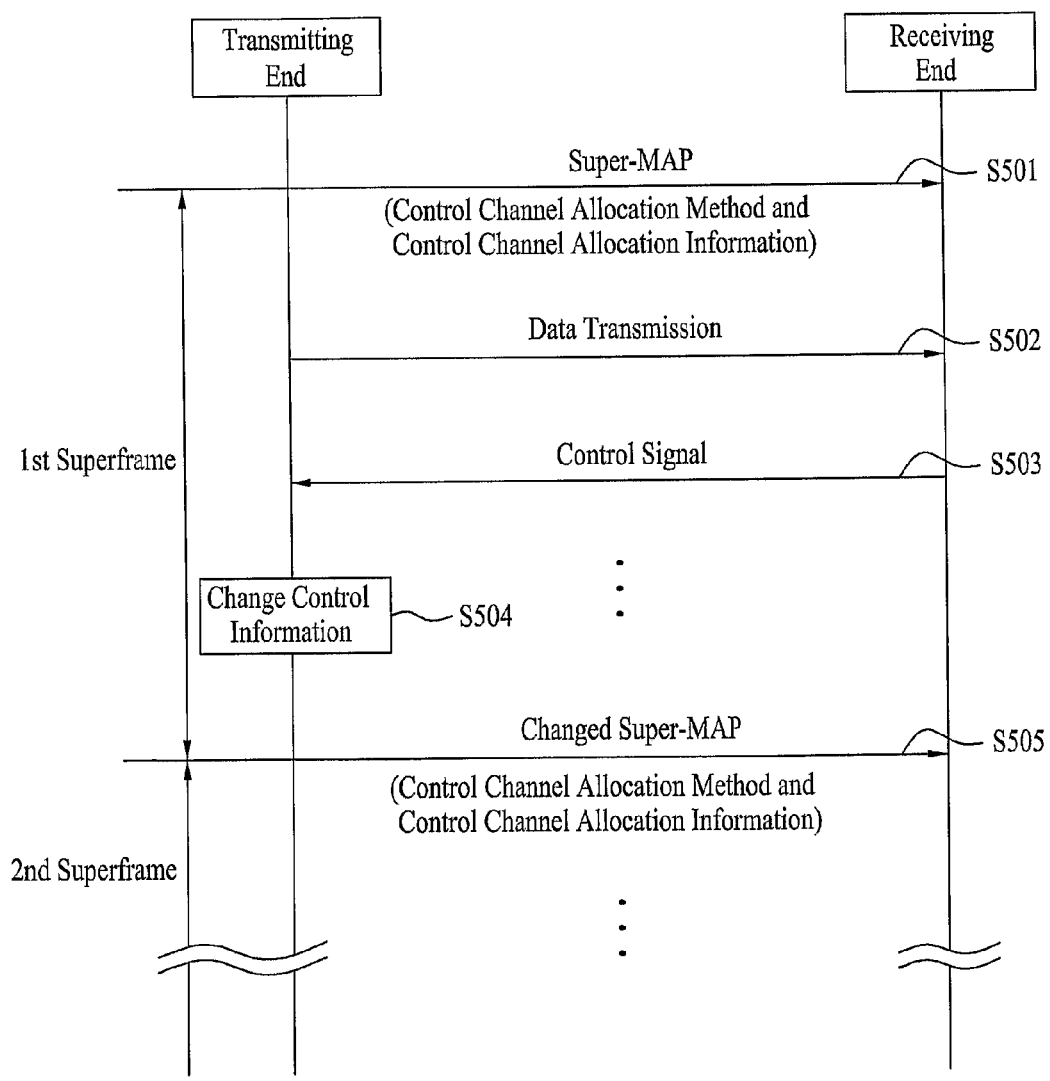
FIG. 5 illustrates a method for allocating a UL control channel using a static allocation method according to an embodiment of the present invention.

FIG. 5 illustrates a method for allocating a UL control channel using a static allocation method according to an embodiment of the present invention.

As shown in FIG. 5, static allocation is a method of allocating a control channel on a superframe basis wherein a super-MAP is used when control information is changed. The transmitting end can transfer a UL control channel allocation method (HARQ ACK/NACK allocation) and control channel allocation information (ACKCH location) to the receiving end by sending a super-MAP to the receiving end. Here, for the UL control channel allocation method and the control channel allocation information included in the super-MAP, reference can be made to Table 1 (S501).

At step S501, the receiving end can identify the control channel allocation method of the transmitting end by checking the 'HARQ ACK/NACK allocation' field included in the super-MAP received from the transmitting end. In addition, the receiving end can identify the allocation location of the control channel by checking the 'ACKCH location' field included in the super-MAP received from the transmitting end. The ACKCH location field is one of control channel allocation information. The term "control channel" used in the embodiments of the present invention refers to a logical channel used to control the system and an ACK channel (ACKCH) can be used as an example of the control channel in the embodiments of the present invention.

Here, the super-MAP can be located at the beginning of the superframe and allocation information or the like of the control channel received through the super-MAP can be applied within the corresponding superframe in the same manner. When no super-MAP is received in the next superframe, the receiving end can use the previously received super-MAP. For example, when the super-MAP period is greater than the superframe period, the super-MAP may not be included in every superframe. Accordingly, the transmitting end can notify the receiving end of whether or not a super-MAP is carried in the current superframe.

The transmitting end can transmit DL data to the receiving end and the receiving end can receive the DL data using resource allocation information included in the sub-MAP (or, Super Map) (S502).

The receiving end can transmit a control signal (for example, an ACK/NACK signal) for data received from the transmitting end to the transmitting end. To transmit the control signal, the receiving end can use the control channel allocation information received at step S501. That is, the receiving end can transmit a control signal to the base station through a UL control channel indicated by the control channel allocation information (e.g. ACKCH location information parameter) (S503).

Here, control information of the transmitting end may be changed due to channel environments while the transmitting end and the receiving end perform communication (S504).

In this case, the transmitting end should provide the changed control information to the receiving end to allow the receiving end to perform proper data transmission control. Accordingly, the transmitting end can transmit a changed super-MAP including control channel allocation information and a control channel allocation method in which the changed control information is reflected to the receiving end through the next superframe (for example, the second superframe) (S505).

The receiving end can transmit a control signal to the transmitting end using the UL control channel allocation information included in the super-MAP received at step S505.

Figure 6:
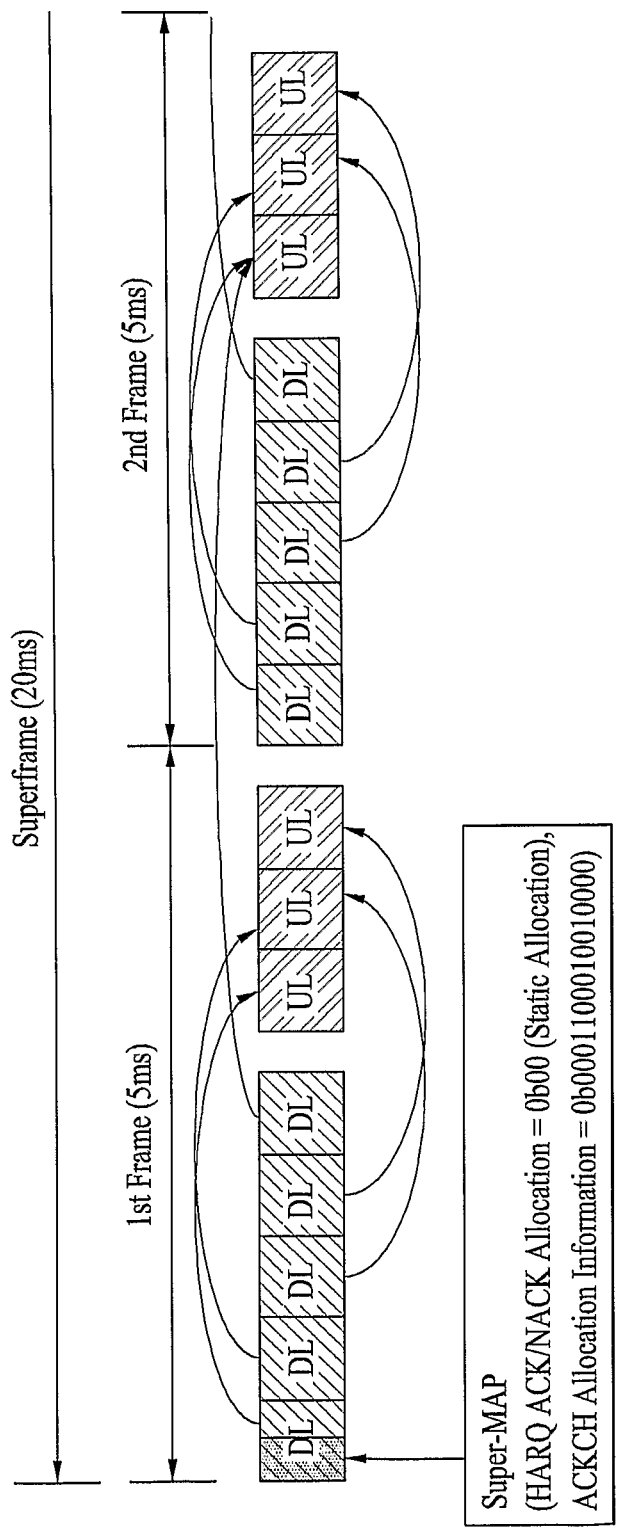
FIG. 6 illustrates a procedure in which the transmitting end allocates a UL control channel to the receiving end using the static allocation method according to an embodiment of the present invention.

FIG. 6 illustrates a procedure in which the transmitting end allocates a UL control channel to the receiving end using the static allocation method according to an embodiment of the present invention.

The method of FIG. 6, which is similar to that of FIG. 5, is applied to the case where allocation information of a control channel (ACK channel) is fixed. If there is a need to change ACK channel allocation information, the transmitting end can change the ACK channel allocation information (e.g. ACKCH location parameter or ACKCH allocation parameter) on a superframe basis.

Specifically, FIG. 6 illustrates a method in which the transmitting end transmits a UL control channel allocation method and control channel allocation information to the receiving end using a super-MAP. In the method of FIG. 6, it is assumed that one superframe (20 ms) includes 4 frames (5 ms) and each frame includes 8 subframes (5 DL subframes and 3 UL subframes).

As shown in FIG. 6, the transmitting end can transmit a super-MAP including a control channel allocation method (HARQ ACK/NACK allocation) and control channel allocation information (ACKCH allocation) in the first DL subframe of the first frame to the receiving end. Here, it is assumed that the super-MAP includes the same information items as those included in Table 1.

Since an 'HARQ ACK/NACK allocation' field in FIG. 6 has been set to '0b00', the field indicates that the static allocation method is used as can be seen from Table 1. In addition, the ACKCH allocation information has been set to '0b0/001/100/010/010/000' in a bitmap format. The bitmap can be read from the right to the left and each set of 3 bits of the bitmap sequentially represents the allocation location of a UL subframe corresponding to each DL subframe. The method of reading the bitmap is the same as that described above with reference to Table 1.

That is, the first 3 bits '000' indicate allocation information of a UL control channel for the first DL subframe. As can be seen from Table 1, the first right bit indicates whether or not the UL frame to which the control channel has been allocated is the first frame or the second frame subsequent to the first frame. The two remaining bits indicate which is the corresponding UL subframe among the three UL subframes. Accordingly, '00' indicates that a control channel of the first UL subframe has been allocated to the first UL subframe.

By reading the bitmap with reference to Table 1 in this manner, it is possible to determine control channel allocation locations of the five DL subframes. Accordingly, an ACK channel of the second DL subframe is located at the second UL subframe of the current frame (first frame), an ACK channel of the third DL subframe is located at the second UL subframe of the first frame, an ACK channel of the fourth DL subframe is located at the third UL subframe of the first frame, and an ACK channel of the fifth DL subframe is located at the first UL subframe of the next frame (second frame).

The UL control channel allocation method and the control channel allocation information set in the super-MAP can be equally applied to every frame in the same superframe.

Figure 7:
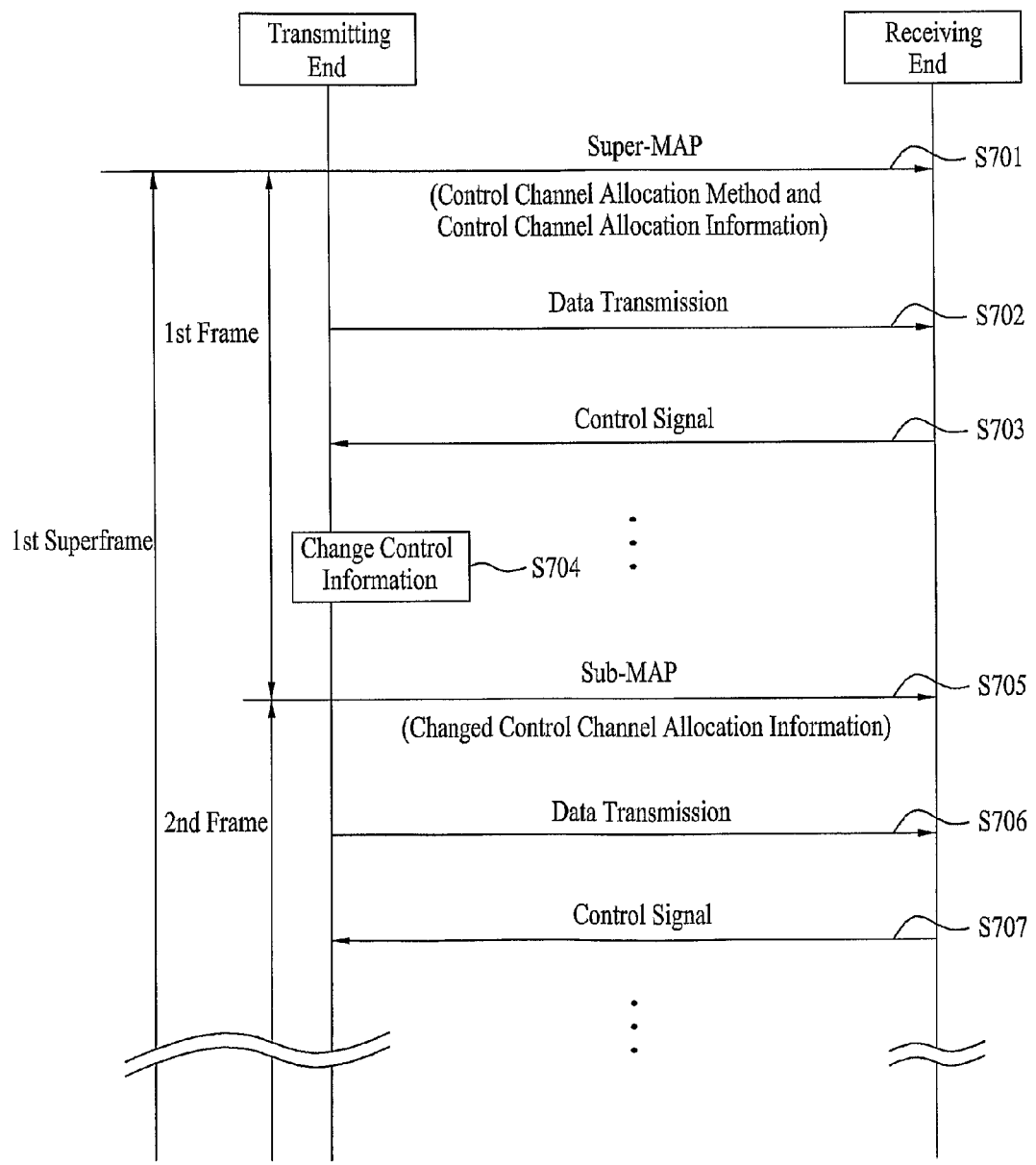
FIG. 7 illustrates a method in which a UL control channel is allocated using a semi-static allocation method through a super-MAP according to another embodiment of the present invention.

FIG. 7 illustrates a method in which a UL control channel is allocated using a semi-static allocation method through a super-MAP according to another embodiment of the present invention.

The semi-static allocation method is a method in which control information allocated through a super-MAP can be changed on a frame basis. Accordingly, the semi-static allocation method can more flexibly cope with channel conditions than the static allocation method.

As shown in FIG. 7, the transmitting end can transmit a super-MAP to the receiving end in a first frame included in the first superframe. Here, the super-MAP may include a UL control channel allocation method and control channel allocation information. For the UL control channel allocation method and control channel allocation information included in the super-MAP, reference can be made to Table 1 (S701).

The transmitting end can transmit DL data to the receiving end and the receiving end can receive the DL data using resource allocation information included in a sub-MAP (or, super-MAP) (S702).

The receiving end needs to transmit a control signal (ACK/NACK signal) for the DL data to the transmitting end. Accordingly, the receiving end can transmit the control signal through an ACK channel of a UL subframe that has been allocated to the receiving end through the UL control channel allocation information at step S701 (S703).

Here, control information may be changed due to changes of channel environments or the like while the transmitting end and the receiving end perform communication. In this case, the transmitting end can provide the changed control information to the receiving end on a frame basis (S704).

Accordingly, the transmitting end can transmit the changed control channel allocation information to the receiving end through a sub-MAP (or a subframe MAP) of the next frame (the second frame) (S705).

In the example illustrated in FIG. 7, a sub-MAP is used to transfer changed control information on a frame basis at step S705. However, if a frame MAP is used according to system requirements, the frame MAP rather than the sub-MAP may be used in the case where control information is changed on a frame basis.

For the changed control channel allocation information included in the sub-MAP at step S705, reference can be made to the following Table 2.

TABLE 2

| Name | Size | Values |
|---|---|---|
| ACKCH scope indication | 1 bit | Indicates a range in which currently transmitted information is maintained. |

TABLE 2-continued

| Name | Size | Values |
|---|---|---|
| | | 0b0: Indicates that transmitted ACK channel allocation information (ACKCH location) is applied only to the current frame.<br>0b1: Indicates that transmitted ACK channel allocation information (ACKCH location) is applied to remaining frames of the current superframe. |
| ACKCH change method | 1 bit | Indicates a changed information transfer method<br>0b0: Bitmap method<br>0b1: Nonbitmap method |
| If(ACKCH change method == 0b0) { | — | — |
| ACKCH location_bitmap | 16 bits | Indicates the location of an ACK channel of a DL subframe.<br>This information has a structure including 3 bits for each subframe. Here, the 1st bit indicates whether a control channel has been allocated to the current or next frame and the remaining two bits indicate the ordinal of the UL subframe to which the control channel has been allocated.<br>bit #0: A bit for the 1st DL subframe, indicating whether the ACK channel is located at the current frame(0b0) or at the next frame(0b1).<br>bits #1~2: Indicates the ordinal of the UL subframe, to which the control channel for the 1st DL subframe has been allocated, in the corresponding frame (which can be identified through bit #0).<br>For example, 0b00 (1st UL subframe), 0b01 (2nd UL subframe), 0b10 (3rd UL subframe), 0b11 (reserved)<br>bits #3~5: Bits for 2nd DL subframe<br>bits #6~8: Bits for 3rd DL subframe<br>bits #9~11: Bits for 4th DL subframe<br>bits #12~14: Bits for 5th DL subframe<br>bit #15: reserved |
| } else {<br>Num of SUBCH<br>For (i=0; i < numb of SUBCH; i++) { | 3 bits | |
| SUBCH ID | 3 bits | Indicates the ordinal of corresponding DL subframe<br>0b000: 1st DL subframe<br>0b001: 2nd DL subframe<br>0b010: 3rd DL subframe<br>0b011: 4th DL subframe<br>0b100: 5th DL subframe<br>0b101~0b111: reserved |
| ACKCH location_Nonbitmap | 3 bits | Indicates changed ACKCH allocation information<br>bit #0: Indicates whether ACK channel is allocated to current frame(0b0) or next frame(0b1).<br>bits #1~2: Indicates the ordinal of the subframe in the corresponding frame to which the control channel has been allocated (where the frame can be identified through bit #0)<br>0b00(1st UL subframe), 0b01(2nd UL subframe), 0b10(3rd UL subframe), 0b11(reserved), |
| }<br>} | | |

When the transmitting end desires to change ACK channel allocation information at step S705, the transmitting end can transmit information of Table 2 through inclusion in a sub-MAP of the second frame.

In Table 2, the ACK channel (ACKCH) scope indication field indicates a range in which changed ACK channel allocation information is maintained. For example, this field can indicate whether changed ACK channel allocation information is applied only to the current frame (second frame) (0b0) or is also applied to the following frames (second to fourth frames) (0b1).

The ACK channel change method (ACKCH change method) field indicates how changed ACK channel allocation information is transmitted. For example, this field can indicate whether or not a bitmap method is used to transmit ACK channel allocation information.

The ACK channel allocation information bitmap (ACKCH location_bitmap) field indicates a bitmap structure for indicating the locations of ACK channels for all DL subframes included in one frame. The bitmap may include a total of 16 bits and has a 3-bit structure for each DL subframe. The first of the three bits can indicate whether the control channel has been allocated to the current frame (first frame) or the next frame (second frame) and the two remaining bits can indicate the ordinal of the UL subframe to which the ACK channel has been allocated. Here, the bitmap structure can be changed according to the number of subframes included in each frame.

The subchannel identifier (SUBCH ID) field can indicate the ordinal of a subframe in which ACK channel allocation information is changed. For example, '0b000' indicates the first DL subframe, '0b001' indicates the second DL subframe, '0b010' indicates the third DL subframe, '0b011' indicates the fourth DL subframe, and '0b100' indicates the fifth DL subframe.

The ACK channel allocation information nonbitmap (ACKCH location nonbitmap) field indicates location information of an ACK channel for one DL subframe. This field may include 3 bits, where bit #0 indicates the location of a frame to which the ACK channel has been allocated and bits #1-2 indicate the location of a subframe in the corresponding frame (second frame). The ACK channel location nonbitmap field is used when the ACK channel change method field has been set to '0b1'.

Referring back to FIG. 7, the transmitting end transmits data through a DL data burst that it has allocated to the receiving end to perform communication with the receiving end (S706).

Since the receiving end has received changed control channel allocation information at step S705, the receiving end can transmit a control signal (ACK/NACK signal) to the transmitting end through the changed ACK channel (S707).

Unlike the embodiment of FIG. 5, when ACK channel allocation information is changed, the transmitting end provides the changed ACK channel allocation information to the receiving end on a frame basis in the embodiment of FIG. 7, thereby enabling efficient data transmission. In addition, the embodiment of FIG. 7 provides a method for allocating a changed ACK channel in a new frame structure, thereby enabling correct data transmission control.

Figure 8:
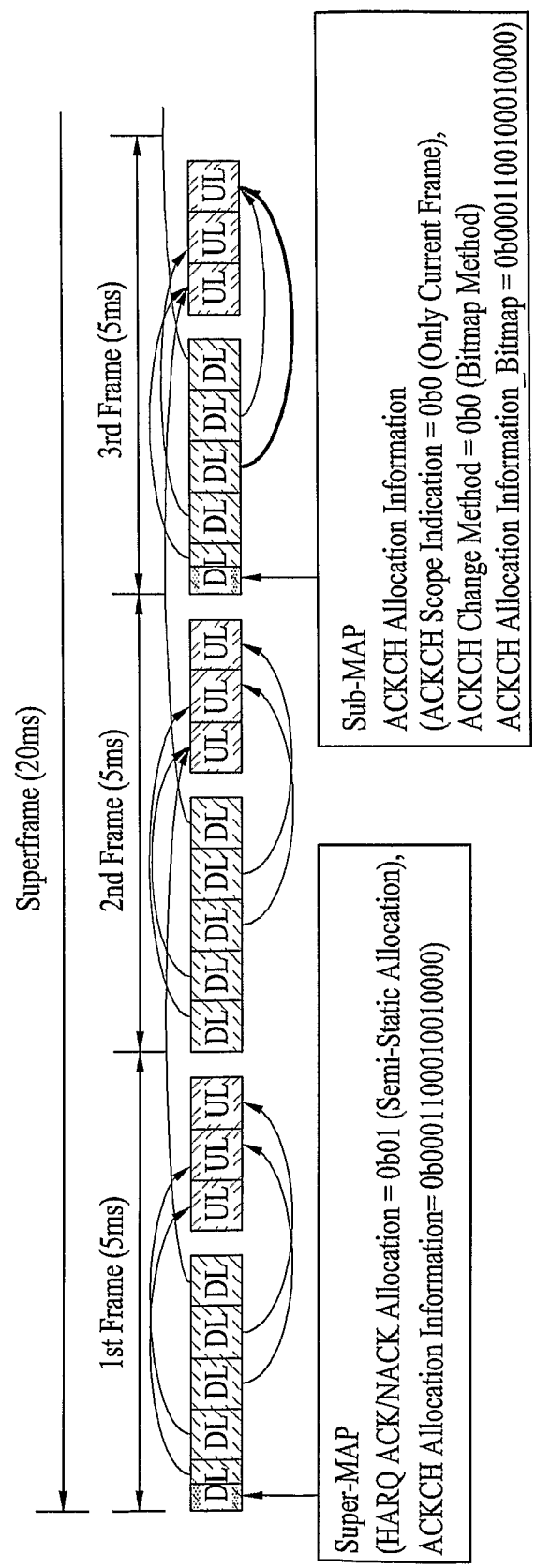
FIG. 8 illustrates a method in which the transmitting end allocates a UL control channel to the receiving end using the semi-static allocation method according to another embodiment of the present invention.

FIG. 8 illustrates a method in which the transmitting end allocates a UL control channel to the receiving end using the semi-static allocation method according to another embodiment of the present invention.

In the method of FIG. 8, which is similar to that of FIG. 7, if there is a need to change ACK channel allocation information, the transmitting end can change the ACK channel allocation information (ACKCH allocation) on a frame basis.

Specifically, FIG. 8 illustrates a method in which the transmitting end transmits a UL control channel allocation method and control channel allocation information to the receiving end using a super-MAP. In the method of FIG. 8, it is assumed that one superframe (20 ms) includes 4 frames (5 ms) and each frame includes 8 subframes (5 DL subframes and 3 UL subframes).

As shown in FIG. 8, the transmitting end can transmit a super-MAP including a control channel allocation method (HARQ ACK/NACK allocation) and control channel allocation information (ACKCH allocation information) in the first DL subframe of the first frame to the receiving end. Here, it is assumed that the super-MAP includes the same information items as those included in Table 1.

Since an 'HARQ ACK/NACK allocation' field in FIG. 8 has been set to '0b01', the field indicates that the semi-static allocation method is used as can be seen from Table 1. In addition, the ACKCH allocation information has been set to '0b0/001/100/010/010/000' in a bitmap format. The bitmap can be read from the right to the left and each set of 3 bits sequentially represents the allocation location of a UL subframe corresponding to each DL subframe. The method of reading the bitmap is the same as that described above with reference to Table 1.

That is, by reading the bitmap with reference to Table 1 in this manner, it is possible to determine control channel allocation locations of the five DL subframes. Accordingly, an ACK channel of the first DL subframe is located at the first UL subframe of the current frame (first frame), an ACK channel of the second DL subframe is located at the second UL subframe of the first frame, an ACK channel of the third DL subframe is located at the second UL subframe of the first frame, an ACK channel of the fourth DL subframe is located at the third UL subframe of the first frame, and an ACK channel of the fifth DL subframe is located at the first UL subframe of the next frame (second frame). If control channel allocation information is not changed in the frame, the UL control channel allocation method and the control channel allocation information set in the super-MAP can be equally applied to every frame in the same superframe.

As shown in FIG. 8, since the control channel has not been changed in the second frame, the control channel of each DL subframe can be allocated in the same manner as in the first frame. However, control channel allocation information has been changed in the third frame.

Accordingly, the transmitting end can notify the receiving end of the changed ACK channel allocation information using a sub-MAP in the first subframe of the third frame. Here, for the ACK channel allocation information included in the frame MAP used in the method of FIG. 8, reference can be made to Table 2.

The changed ACK channel allocation information is applied only to the third frame since the ACK channel (ACKCH) scope indication field indicates '0b0' as can be seen from ACK channel allocation information included in the frame MAP shown in FIG. 8. In addition, the changed ACK channel can be allocated through a bitmap since the ACKCH change method field indicates '0b0'. It can also be seen that the ACK channel location bitmap (ACKCH location_bitmap) is '0b0/001/100/100/010/000'. Accordingly, it can be seen from the ACK channel location bitmap that an ACK channel allocated to the third DL subframe in the third frame has been changed.

In FIG. 8, the bitmap of the third DL subframe has been changed from '010' to '100'. Thus, the receiving end can determine that the location of the ACK channel of the third DL subframe has been changed from the second UL subframe to the third UL subframe. The receiving end can transmit a control signal to the transmitting end through the changed control channel.

Figure 9:
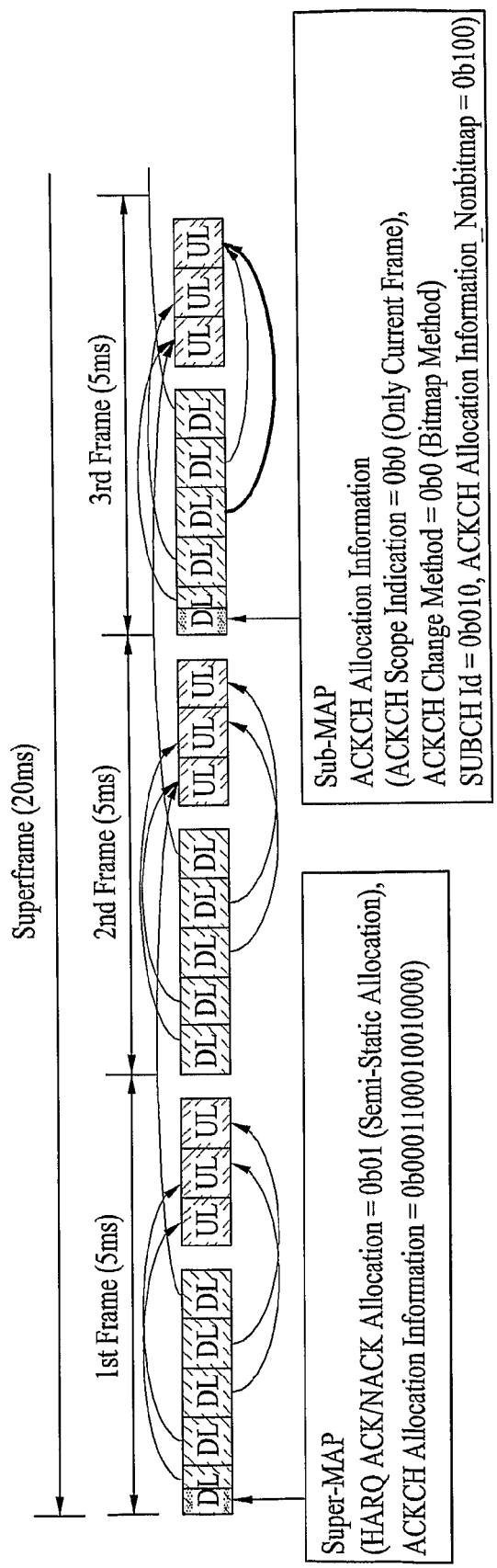
FIG. 9 illustrates another method in which the transmitting end allocates a UL control channel using the semi-static allocation method according to another embodiment of the present invention.

FIG. 9 illustrates another method in which the transmitting end allocates a UL control channel using a semi-static allocation method according to another embodiment of the present invention.

The method of FIG. 9 is basically similar to that of FIG. 8. However, the method of FIG. 9 differs from that of FIG. 8 in that the transmitting end notifies the receiving end of a changed ACK channel in the third frame. Accordingly, refer to the description of FIG. 8 for details of the first and second frames. In addition, for the ACK channel allocation information included in the frame MAP in the third frame, reference can be made to Table 2.

Changed ACK channel allocation information included in the frame MAP can be seen from FIG. 9. The changed ACK channel allocation information is applied only to the third frame since the ACK channel (ACKCH) scope indication field indicates '0b0'.

Unlike the method of FIG. 8, in the method of FIG. 9, the bitmap is not used for ACK channel allocation since the ACKCH change method field indicates '0b1'. However, the transmitting end can directly provide changed DL subframe and ACK channel allocation information.

The receiving end can determine that the DL subframe for which control information is changed is the third subframe in the current frame (first frame) since the subchannel identifier (SUBCH ID) field indicates '0b010' in FIG. 9. In addition, the ACK channel allocation information nonbitmap (ACKCH location nonbitmap) field indicates '0b100'. Accordingly, the receiving end can determine that a changed ACK channel for the third DL subframe has been allocated to the third UL subframe of the third frame.

Figure 10:
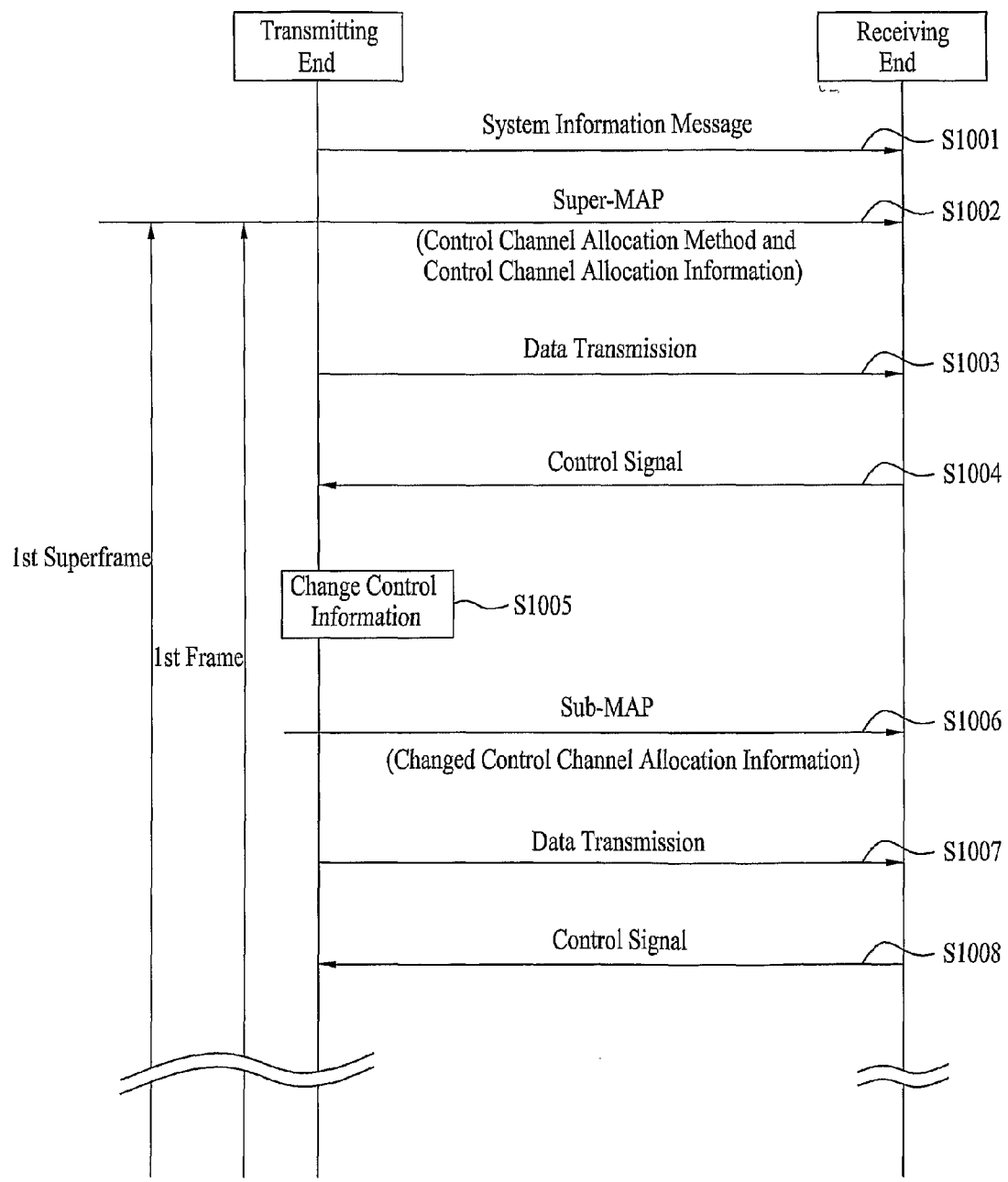
FIG. 10 illustrates a method in which a UL control channel is allocated using a dynamic allocation method according to another embodiment of the present invention.

FIG. 10 illustrates a method in which a UL control channel is allocated using a dynamic allocation method according to another embodiment of the present invention.

The dynamic allocation method used in the method of FIG. 10 is a method in which the transmitting end can change control channel allocation information (for example, ACKCH location information, or ACKCH allocation information) allocated using a super-MAP according to communication environments on a subframe basis. That is, the transmitting end can change ACK channel allocation information of a specific DL subframe using the dynamic allocation method on a subframe basis.

As shown in FIG. 10, the transmitting end can transmit a system information message including basic communication information to the receiving end to perform communication with the receiving end. Here, the system information message may include UCD and DCD messages (S1001).

The transmitting end can notify the receiving end of a UL control channel allocation method (i.e., the dynamic allocation method) and control channel allocation information (for example, ACKCH location information, or ACKCH allocation information) using a super-MAP in the first superframe. Here, for the super-MAP, reference can be made to Table 1 (S1002).

The transmitting end can transmit DL data to the receiving end using a DL burst channel (S1003).

By confirming the dynamic allocation method and the control channel allocation information, the receiving end can identify the allocated control channel. Accordingly, the receiving end can transmit a control signal (ACK/NACK signal) to the transmitting end through a UL ACK channel allocated to the receiving end (S1004).

The communication environments may be changed while the transmitting end and the receiving end perform communication. That is, control information of the control channel may be changed (S1005).

When the control information has been changed, the transmitting end should quickly transfer the changed control information to the receiving end for correct data transmission control. Accordingly, the transmitting end can transmit changed ACK channel allocation information for the DL subframe to the receiving end using a sub-MAP (S1006).

At step S1006, the transmitting end can use the sub-MAP to transmit the changed ACK channel allocation information to the receiving end. The following table 3 illustrates an example format of changed ACK channel allocation information that can be included in the sub-MAP of step S1006.

TABLE 3

| Name | Size | Values |
| --- | --- | --- |
| ACKCH scope indication | 1 bit | Indicates a range in which currently transmitted ACK channel information is maintained.<br>0b0: Indicates that transmitted ACK channel allocation information is applied only to the current subframe.<br>0b1: Indicates that transmitted ACK channel allocation information is applied to subframes which are located at the same location as the current subframe in remaining frames until a next superframe is initiated. |
| ACKCH location | 3 bits | Indicates location information of a UL subframe to which the ACK channel is allocated.<br>bit #0: Indicates whether the ACK channel is located at the current frame (0b0) or at the next frame (0b1).<br>bits #1-2: Indicates the ordinal of the UL subframe in the corresponding frame (which can be identified through bit #0).<br>0b00 (first UL subframe), 0b01 (second UL subframe), 0b10 (third UL subframe), 0b11 (reserved) |

In Table 3, the ACKCH scope indication field indicates a range in which the changed ACK channel allocation information is applied. That is, this field indicates whether the changed ACK channel allocation information is applied only to the current subframe (0b0) or is also applied to subframes which are located at the same location as the current subframe in remaining frames in the current superframe (0b1).

The ACK channel allocation information (ACKCH location) field indicates location information of an ACK channel for the current DL subframe. The ACK channel allocation information field includes 3 bits, where the first bit (bit #0) indicates the location of a frame to which the changed ACK channel is allocated. The second and third bits (bits #1-2) indicate the location of the UL subframe in the corresponding frame.

Referring back to FIG. 10, the receiving end receives a sub-MAP including changed control channel allocation information from the transmitting end at step S1006. The transmitting end transmits DL data to the receiving end (S1007) and the receiving end can transmit a control (ACK/NACK) signal for the transmitted data through the changed UL subframe which has been allocated to the receiving end at step S1006 (S1008).

Unlike the method of FIG. 7, allocation is performed by changing control information on a subframe basis instead of changing control information every frame in the method of FIG. 10. The method of FIG. 10 has an advantage in that it is possible to quickly and dynamically cope with channel environments.

Figure 11:
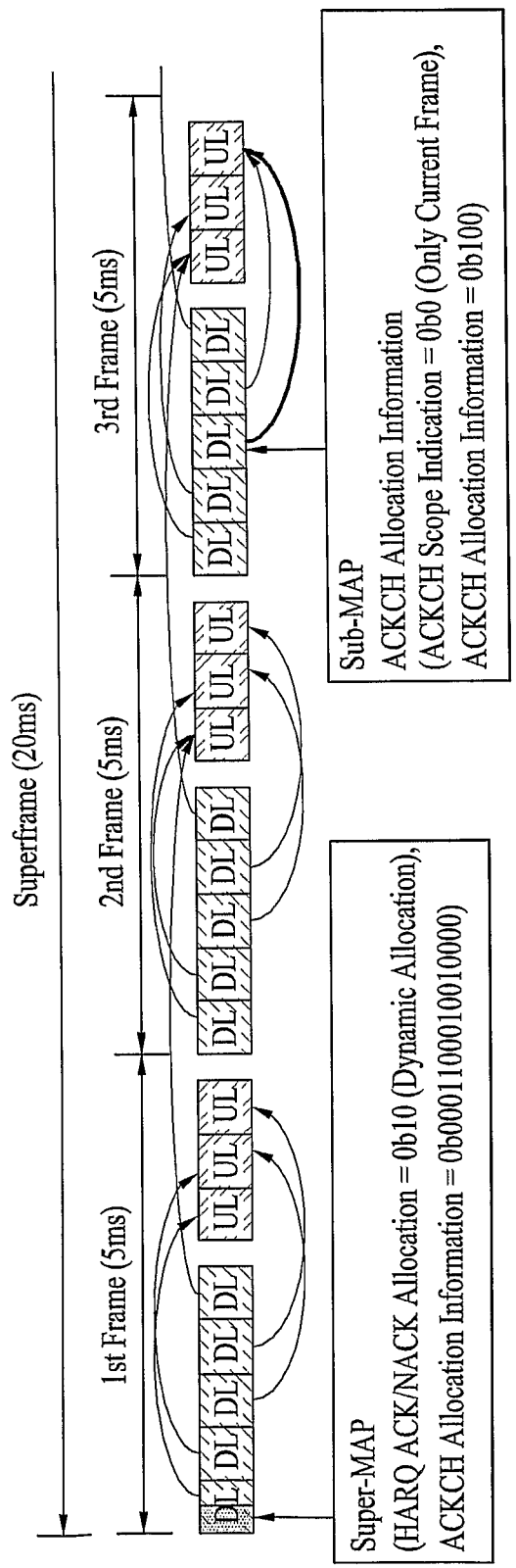
FIG. 11 illustrates a method in which the transmitting end allocates a control channel using the dynamic allocation method according to another embodiment of the present invention.

FIG. 11 illustrates a method in which the transmitting end allocates a control channel using the dynamic allocation method according to another embodiment of the present invention.

In the method of FIG. 11, which is similar to that of FIG. 10, if there is a need to change ACK channel allocation information, the transmitting end can change the ACK channel allocation information (ACKCH allocation) on a subframe basis.

Specifically, FIG. 11 illustrates a method in which the transmitting end transmits a UL control channel allocation method and control channel allocation information to the receiving end using a super-MAP. In the method of FIG. 11, it is assumed that one superframe (20 ms) includes 4 frames (5 ms) and each frame includes 8 subframes (for example, 5 DL subframes and 3 UL subframes).

As shown in FIG. 11, the transmitting end can transmit a super-MAP including a control channel allocation method (HARQ ACK/NACK allocation) and control channel allocation information (ACKCH allocation) in the first DL subframe of the first frame to the receiving end. Here, for information items included in the super-MAP, reference can be made to Table 1.

Since an 'HARQ ACK/NACK allocation' field in FIG. 11 has been set to '0b10', the field indicates that the dynamic allocation method is used as can be seen from Table 1. In addition, the ACK channel allocation information (ACKCH location) field has been set to '0b0/001/100/010/010/000' in a bitmap format. The bitmap can be read from the right to the left and each set of 3 bits sequentially represents the allocation location of a UL subframe corresponding to each DL subframe. The method of reading the bitmap is the same as that described above with reference to Table 1.

For information of a UL subframe to which an ACK channel for each DL subframe has been allocated at the first and second frames, reference can be made to FIGS. 6 to 9. The following description will be given only on a frame (3rd frame) in which control channel information for a DL subframe has been changed.

As shown in FIG. 11, the transmitting end can transmit a sub-MAP to the transmitting end in the third DL subframe in order to change a control channel for the third DL subframe among subframes included in the third frame. Here, for changed ACK channel allocation information in the sub-MAP, reference can be made to Table 7.

Since an ACK channel (ACKCH) scope indication field included in the sub-MAP has been set to '0b0', this field can indicate that changed control information is applied only to the current frame (third frame) as can be seen from Table 7.

Since an ACKCH allocation information field (or, ACKCH location field) included in the sub-MAP has been set to '0b100', this field can indicate the location of the changed UL subframe. That is, the UL subframe to which the changed ACK channel has been allocated is the third UL subframe of the current frame (third frame).

According to the methods described above with reference to FIGS. 10 and 11, when the user desires to change control information of one DL subframe, it is possible to efficiently change control information of only the subframe rather than changing control information of the entire superframe or control information of each frame.

Figure 12:
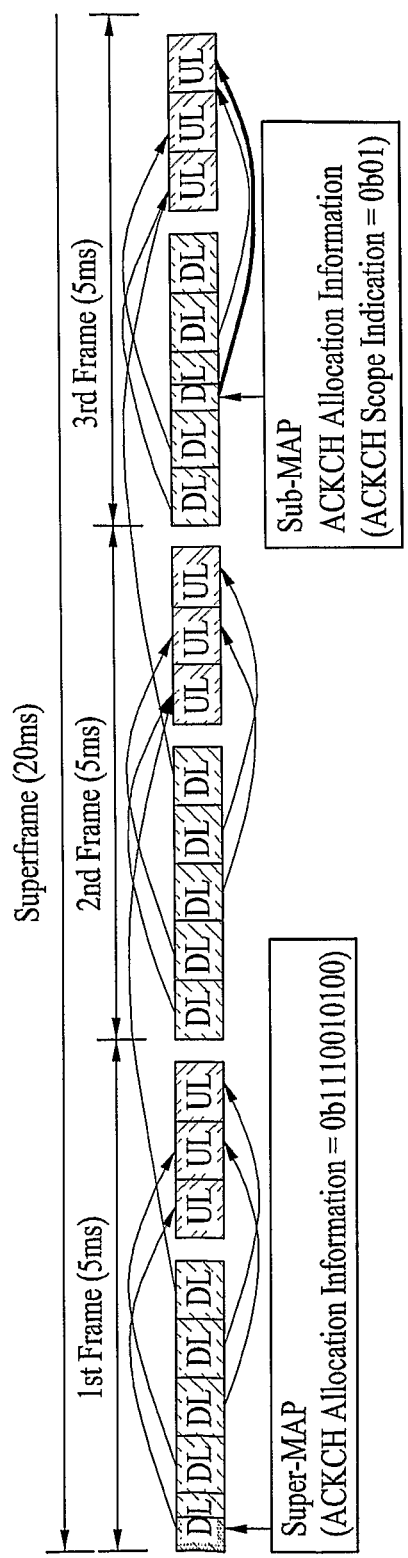
FIG. 12 illustrates a method for allocating a control channel using the dynamic allocation method according to another embodiment of the present invention.

FIG. 12 illustrates a method for allocating a control channel using the dynamic allocation method according to another embodiment of the present invention.

The method of FIG. 12 is similar to that of FIG. 11. However, in the method of FIG. 12, ACK channel allocation information and changed ACKCH allocation information included in the super-MAP are optimized to reduce overhead when a MAP message is transmitted.

In the method of FIG. 12, the transmitting end can transmit the super-MAP to the receiving end through a first DL subframe of a first frame included in a superframe. Control channel information set by the super-MAP can be equally applied to all frames of the superframe if the control information is not changed.

The following Table 4 illustrates an example optimized format of the ACKCH allocation information (e.g. ACKCH location) field included in the super-MAP in Table 1.

TABLE 4

| Name | Size | Values |
|---|---|---|
| ACKCH location | 10 bits | Indicates the location of an ACK channel for a DL subframe. Has a 2-bit structure for each subframe. Information indicated by the two bits is as follows. 0b00: 1st UL subframe of each frame, 0b01: 2nd UL subframe of each frame, 0b10: 3rd UL subframe of each frame, 0b11: 1st UL subframe of next frame. Information indicated by each of the 10 bits represented by the bitmap is as follows. Bit #0~1: Bits for 1st DL subframe, Bit #2~3: Bits for 2nd DL subframe, Bit #4~5: Bits for 3rd DL subframe, Bit #6~7: Bits for 4th DL subframe, Bit #8~9: Bits for 5th DL subframe. |

In Table 4, which is an optimized format of Table 1, the 3-bit structure is reduced to the 2-bit structure when the ACK channel allocation information is represented by a bitmap. That is, Table 4 omits a bit indicating whether a control channel allocated to each DL subframe is located at the current frame or at the next frame. Accordingly, when Table 4 is used, only the first UL subframe is used in the next frame.

As can be seen from Table 4, information for allocating control channels for 5 DL subframes can be obtained using the 2-bit structure. In the 2-bit structure, '0b00' indicates the first UL subframe of each frame, '0b01' indicates the second UL subframe of each frame, '0b10' indicates the third UL subframe of each frame, and '0b11' indicates the first UL subframe of the next frame.

Although all UL subframes of the next frame can be used since the 3-bit structure is represented as '0bxxx' in Table 1, only the first UL subframe of the next frame can be used in Table 4.

Referring back to FIG. 12, the transmitting end can transmit the super-MAP using Table 4 to the receiving end in the first DL subframe of the first frame. In the super-MAP, the ACK channel allocation information is represented by the bitmap. The bitmap is constructed as '0b11/10/01/01/00'. Starting from the right end of the bitmap, each set of 2 bits of the bitmap sequentially represents the location of a UL subchannel to which an ACK channel allocated to each DL subchannel has been allocated.

Accordingly, the receiving end can determine that an ACK channel for the first DL subchannel is located at the first UL subframe, an ACK channel for the second DL subchannel is located at the second UL subframe, an ACK channel for the third DL subchannel is located at the second UL subframe, an ACK channel for the fourth DL subchannel is located at the third UL subframe, and an ACK channel for the fifth DL subchannel is located at a first UL subframe of the next frame.

Channel environments may vary while the transmitting end and the receiving end communicate, thereby necessitating control information change. In this case, in the method of FIG. 12, control information may be changed for each subframe.

The following Table 5 illustrates an example optimized format of the ACK channel allocation information (ACKCH location) field included in the sub-MAP in Table 3.

TABLE 5

| Name | Size | Values |
|---|---|---|
| ACKCH location | 2 bits | Location information of a UL subframe to which the ACK channel is allocated. 0b00: 1st UL subframe of the current frame, 0b01: 2nd UL subframe of the current frame, 0b10: 3rd UL subframe of the current frame, 0b11: 1st UL subframe of the next frame. |

Table 5 illustrates changed ACK channel allocation information included in the sub-MAP that is transmitted in a specific DL subframe in the case where the transmitting end desires to change ACK channel allocation information. Information changed through Table 5 is applied only to a subframe in which the sub-MAP has been transmitted. This is because an information bit indicating the corresponding frame is omitted in the ACK channel allocation information of Table 3 in order to optimize the ACK channel allocation information of Table 3.

As can be seen from Table 5, the ACK channel allocation information (ACKCH location) has a 2-bit size. If the ACK channel allocation information is '0b00', this indicates that the ACK channel has been allocated to the first UL subframe in the current frame in which the sub-MAP has been transmitted. If the ACK channel allocation information is '0b01', this indicates that the ACK channel has been allocated to the second UL subframe in the current frame in which the sub-MAP has been transmitted. If the ACK channel allocation information is '0b10', this indicates that the ACK channel has been allocated to the third UL subframe in the current frame in which the sub-MAP has been transmitted. If the ACK channel allocation information is '0b11', this indicates that the ACK channel has been allocated to a first UL subframe in a frame subsequent to the frame in which the sub-MAP has been transmitted.

Referring back to FIG. 12, the transmitting end desires to change control information allocated to the third DL subframe of the third frame included in the superframe. Accordingly, the transmitting end can transmit a sub-MAP including changed ACK channel information to the receiving end in the third DL subframe of the third frame. Here, for the sub-MAP, reference can be made to Table 5.

The receiving end can confirm that the ACK channel allocation information (ACKCH location) included in the sub-MAP is '0b10'. It can be seen from Table 5 that the UL subframe to which the changed ACK channel has been allocated is the third UL subframe of the third frame.

Specifically, FIG. 12 illustrates the case where the location of the ACK channel for the third DL subframe of the third frame has been changed from the second UL subframe (01) of the third frame to the third UL subframe (10) of the third frame.

If the changed ACK channel location is not indicated in the sub-MAP, the receiving end can use basic ACK channel allocation information received in the super-MAP.

Figure 13:
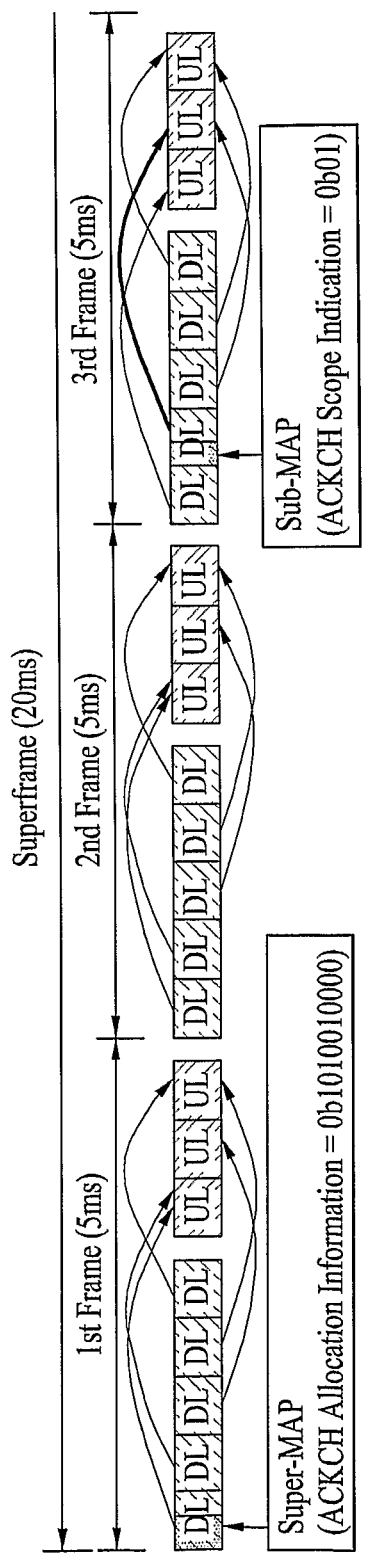
FIG. 13 illustrates a method for allocating a control channel using the dynamic allocation method according to another embodiment of the present invention in the case where a changed ACK channel is located only in a UL subchannel in a corresponding frame.

FIG. 13 illustrates a method for allocating a control channel using the dynamic allocation method according to another embodiment of the present invention in the case where a changed ACK channel is located only at a UL subchannel in a corresponding frame.

The method of FIG. 13 is similar to that of FIG. 12. Accordingly, in the method of FIG. 13, ACK channel allocation information and changed ACK channel allocation information included in the super-MAP are optimized to reduce overhead when a MAP message is transmitted.

In the method of FIG. 13, the transmitting end can transmit the super-MAP to the receiving end through a first DL subframe of a first frame included in a superframe. Control channel information set by the super-MAP can be equally applied to all frames of the superframe if the control information is not changed.

The following Table 6 illustrates another example optimized format of the ACK channel allocation information (ACKCH location) included in the super-MAP in Table 1.

TABLE 6

| Name | Size | Values |
|---|---|---|
| ACKCH location | 10 bits | Indicates the location of an ACK channel for a DL subframe. Has a 2-bit structure for each subframe. Information indicated by the two bits is as follows. 0b00: 1st UL subframe of each frame, 0b01: 2nd UL subframe of each frame, 0b10: 3rd UL subframe of each frame, 0b11: reserved. Information indicated by each of the 10 bits represented by the bitmap is as follows, Bit #0~1: Bits for 1st DL subframe, Bit #2~3: Bits for 2nd DL subframe, Bit #4~5: Bits for 3rd DL subframe, Bit #6~7: Bits for 4th DL subframe, Bit #8~9: Bits for 5th DL subframe. |

Table 6 is similar to Table 4. However, when the 2-bit structure is used to indicate the location of the UL subframe, '0b11' is set as a reserved bit so that control information is applied only to the current frame.

Accordingly, the description of Table 4 can be referred to for remaining parts of Table 6.

In FIG. 13, the bitmap of ACK channel allocation information set by the super-MAP is '0b10/10/01/00/00'. It can be seen from Table 6 that ACK channels for the first and second DL subframes of the first frame are located at the first UL subframe of the first frame, an ACK channel for the third DL subframe of the first frame is located at the second UL subframe of the first frame, and ACK channels for the fourth and fifth DL subframes of the first frame are located at the third UL subframe of the first frame.

FIG. 13 illustrates the case where the ACK channel allocation information of the second DL subchannel of the third frame has been changed. The changed ACK channel allocation information (ACKCH location) of the second DL subframe is as shown in the following Table 7.

TABLE 7

| Name | Size | Values |
|---|---|---|
| ACKCH location | 2 bits | Indicates a location offset of an ACK channel for the current DL frame. Indicates a UL subframe to which the ACK channel has been allocated. 0b00: 1st UL subframe, 0b01: 2nd UL subframe, 0b10: 3rd UL subframe, 0b11: reserved. |

Table 7 illustrates changed ACK channel allocation information transmitted in the sub-MAP.

The ACK channel allocation information of Table 7 included in the sub-MAP can be applied only to the transmitted subframe. The ACK channel for the corresponding DL subframe can be located at one of the three subframes in the current frame. Accordingly, '0b00' indicates the first UL subframe, '0b01' indicates the second UL subframe, '0b10' indicates the third UL subframe, and '0b11' is a reserved value.

Referring back to FIG. 13, the location of the ACK channel for the second DL subframe of the third frame has been changed from the first UL subframe (00) of the same frame (third frame) to the second UL subframe (01) of the same frame. If location information of the changed ACK channel is not included in the sub-MAP, the terminal can use ACK channel allocation information received through the super-MAP in order to locate the ACK channel.

Figure 14:
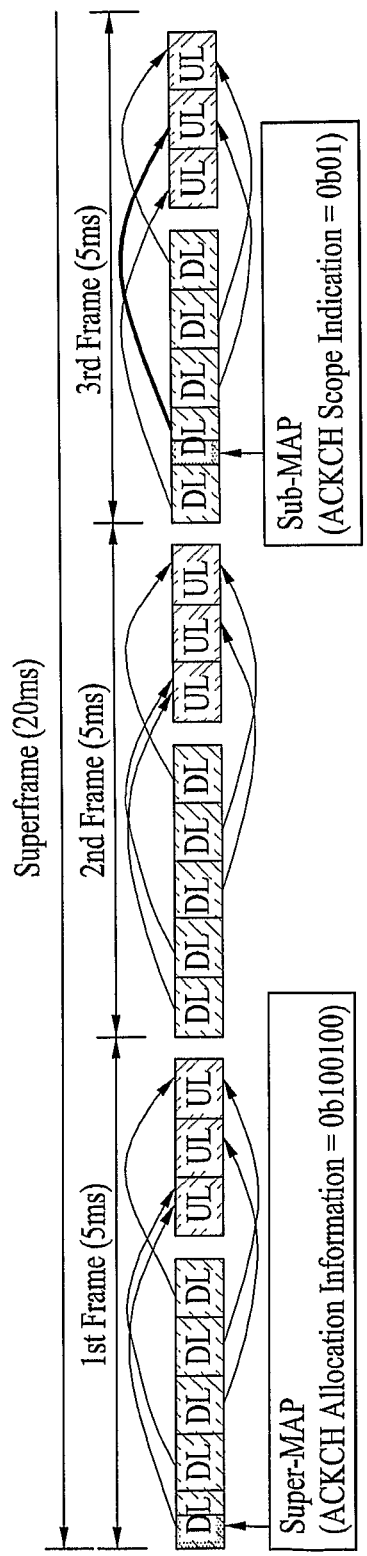
FIG. 14 illustrates a method for allocating a control channel using the dynamic allocation method according to another embodiment of the present invention in the case where a changed ACK channel is located only in a UL subchannel in a corresponding frame.

FIG. 14 illustrates a method for allocating a control channel using the dynamic allocation method according to another embodiment of the present invention in the case where a changed ACK channel is located only in a UL subchannel in a corresponding frame.

In the method of FIG. 14, ACK channels for the first DL subframe and the fifth DL subframe of each frame are fixed and only ACK channel allocation information of the remaining DL subframes is transmitted, unlike the method of FIG. 13. Accordingly, a 6-bit field can be used to indicate ACK channel allocation information included in the super-MAP. Thus, the method of FIG. 14 can reduce MAP message overhead, compared to the method of FIG. 13.

The following Table 8 illustrates another example optimized format of ACK channel allocation information included in the super-MAP.

TABLE 8

| Name | Size | Values |
|---|---|---|
| ACKCH location | 6 bits | Indicates the allocation location of ACK channels for second, third, and fourth DL subframes. Has a 2-bit structure for each DL subframe. Information indicated by the two bits is as follows. 0b00: 1st UL subframe, 0b01: 2nd UL subframe, 0b10: 3rd UL subframe, 0b11: reserved. Information indicated by each of a total of 6 bits is as follows. Bit #0~1: Bits for 2nd DL subframe, Bit #2~3: Bits for 3rd DL subframe, Bit #4~5: Bits for 4th DL subframe. |

As shown in Table 8, bits #0-1 in the 6-bit ACK channel allocation information included in the super-MAP are bits for the second DL subframe, bits #2-3 are bits for the third DL subframe, and bits #4-5 are bits for the fourth DL subframe. In addition, '0b00' in the 2-bit structure indicates the first UL subframe, '0b01' indicates the second UL subframe, '0b10' indicates the third UL subframe, and '0b11' is a reserved value.

In FIG. 14, it is assumed that ACK channels for the first and fifth DL subframes of each frame are allocated to the first and third UL subframes of the same frame. Here, a bitmap of ACK channel allocation information set in the super-MAP is '0b10/01/00'.

Accordingly, it can be seen from the bitmap in Table that an ACK channel for the second DL subframe is allocated to the first UL subframe, an ACK channel for the third DL subframe is allocated to the second UL subframe, and an ACK channel for the fourth DL subframe is allocated to the third UL subframe.

In FIG. 14, the allocation locations of ACK channels for the first and last (for example, fifth) DL subframes of each frame can be initially transmitted through a system information transfer message (for example, a UCD or DCD message). In this case, ACK channel information of the first and last DL subframes may not be transmitted through the super-MAP.

In the case of FIG. 14, the allocation location of the ACK channel of the second DL subframe of the third frame has been changed. Accordingly, the transmitting end can use the sub-MAP to transmit the changed ACK channel allocation information to the receiving end. Here, for the changed ACK channel allocation information included in the sub-MAP, reference can be made to Table 6.

In the method of FIG. 14, the transmitting end can notify the receiving end of the changed ACK channel location using the sub-MAP in the second DL subframe. That is, since the ACK channel allocation information is '0b01', this indicates that the location of the ACK channel has been changed from the first UL subframe (00) to the second UL subframe (01). If the changed ACK channel allocation information field is not included in the sub-MAP, the receiving end can use the basic ACK channel allocation location received through the super-MAP to determine the allocation location of the ACK channel.

The method described above with reference to FIGS. 13 and 14 can reduce the size of the MAP message in the method of FIG. 11, thereby reducing MAP message overhead. In addition, in the method of FIGS. 13 and 14, when HARQ is applied, an ACK/NACK signal can be received in a corresponding frame, thereby overcoming the problems of data processing delay and transfer delay.

The following Table 9 illustrates an example format of UL ACK channel allocation information that can be periodically transmitted within a system information transfer message according to another embodiment of the present invention.

TABLE 9

| Name | Size | Values |
|---|---|---|
| ACKCH location | 4 bits | Indicates the allocation location of ACK channels for first and last DL subframes. Has a 2-bit structure for each DL subframe. Information indicated by the two bits is as follows. 0b00: 1st UL subframe, 0b01: 2nd UL subframe, 0b10: 3rd UL subframe, 0b11: reserved. Information indicated by each of a total of 4 bits is as follows. Bit #0~1: Bits for 1st DL subframe, Bit #2~3: Bits for last DL subframe. |

Table 9 can be included in a system information transfer message when the ACK channel allocation location is not frequently changed. As shown in Table 9, bits #0-1 of the 4 bits of the ACK channel allocation information (ACKCH location) indicate allocation information of the ACK channel for the first DL subframe and bits #2-3 indicate allocation information of the ACK channel for the last DL subframe.

The ACK channel allocation information is constructed as a 2-bit structure, where '0b00' indicates the first UL subframe, '0b01' indicates the second UL subframe, '0b10' indicates the third UL subframe, and '0b11' is a reserved value.

In the method of FIG. 14, Table 9 can be used to indicate ACK channel allocation information of the first and last DL subframes. In addition, Table 8 can be used to indicate ACK channel allocation information of the remaining DL subframes (for example, second, third, and fourth DL subframes). That is, Tables 8 and 9 illustrate a structure of information that the transmitting end transmits to transfer basic ACK channel information, wherein the information is divided and carried in each message. Table 8 can be transmitted through inclusion in the super-MAP and Table 9 can be transmitted through inclusion in a system information transfer message such as UCD.

Let us assume that Tables 8 and 9 are applied to the case of FIG. 10.

In this case, in the method of FIG. 10, the transmitting end can transmit Table 9 to the receiving end through inclusion in the system information message used at step S1001 and transmit Table 8 to the receiving end through inclusion in the super-MAP used at step S1002. In addition, in the case where there is a need to change ACK channel allocation information, the transmitting end can transmit changed ACK channel allocation information to the receiving end through the sub-MAP using Table 7 at step S1006.

In the embodiments of the present invention, information items included in the super-MAP described above with reference to Tables 1, 4, 6, and 8 can be transmitted through a system information transfer message (for example, a UCD/DCD message) according to system environments. Accordingly, in the case where ACK channel allocation information is not frequently changed, the transmitting end can transmit ACK channel allocation information through a UCD/DCD message rather than the super-MAP.

The following Table 10 illustrates a structure of location information of an HARQ ACK channel transferred through a system information transfer message such as UCD.

TABLE 10

| Name | Size | Values |
|---|---|---|
| HARQ ACK/NACK Allocation | 2 bits | 0b00: static allocation<br>0b01: semi-static allocation<br>0b10: dynamic allocation<br>0b11: reserved |
| ACKCH location | 16 bits | This indicates the location of an ACK channel for a DL subframe.<br>ACK allocation information can be expressed in bitmap form. Here, 3 bits for each DL subframe indicate a corresponding UL subframe.<br>That is, 1st bit indicates whether it is included in a current frame or a next frame and the other two bits indicate the ordinal of the UL subframe.<br>bit #0: A bit for 1st DL subframe, indicating whether ACK channel has been allocated to current frame(0b0) or next frame(0b1).<br>bits #1~2: Bits indicating the ordinal of the UL subframe in the 1st DL subframe (where the frame can be identified through bit #0).<br>0b00 - 1st UL subframe<br>0b01 - 2nd UL subframe<br>0b10 - 3rd UL subframe)<br>0b11- reserved<br>bits #3~5: Bits for 2nd DL subframe<br>bits #6~8: Bits for 3rd DL subframe<br>bits #9~11: Bits for 4th DL subframe<br>bits #12~14: Bits for 5th DL subframe<br>bit #15: reserved |

Details of information included in Table 10 are identical to details of that of Table 1 among the HARQ ACK channel information structures included in the super-MAP described above with reference to Tables 1, 4, 6, and 8. In the case where the system transmits an HARQ ACK channel structure to terminals using a system information transfer message rather than using the super-MAP, the HARQ ACK channel structure as shown in Table 10 can be transmitted through inclusion in the system information transfer message. For details of this, reference can be made to Table 1.

The following Table 11 illustrates another example structure of HARQ ACK channel location information that is transmitted through a system information transfer message such as UCD.

TABLE 11

| Name | Size | Values |
|---|---|---|
| ACKCH location | 10 bits | Indicates the location of an ACK channel for a DL subframe.<br>Has a 2-bit structure for each subframe. Information indicated by the two bits is as follows.<br>0b00: 1st UL subframe of each frame,<br>0b01: 2nd UL subframe of each frame,<br>0b10: 3rd UL subframe of each frame,<br>0b11: 1st UL subframe of next frame.<br>Information indicated by each of the 10 bits represented by the bitmap is as follows.<br>Bit #0~1: Bits for 1st DL subframe,<br>Bit #2~3: Bits for 2nd DL subframe,<br>Bit #4~5: Bits for 3rd DL subframe,<br>Bit #6~7: Bits for 4th DL subframe,<br>Bit #8~9: Bits for 5th DL subframe, |

Table 11 is an optimized format of Table 10. Details of information included in Table 11 are identical to details of that of Table 4 among the HARQ ACK channel information structures (of Tables 1, 4, 6, and 8) included in the super-MAP.

In the case where the system transmits an HARQ ACK channel structure to terminals using a system information transfer message rather than using the super-MAP, the HARQ ACK channel structure as shown in Table 11 should be included in the system information transfer message. For details of this, reference can be made to Table 4.

The following Table 12 illustrates another example structure of HARQ ACK channel location information that is transmitted through a system information transfer message such as UCD.

TABLE 12

| Name | Size | Values |
|---|---|---|
| ACKCH location | 10 bits | Indicates the location of an ACK channel for a DL subframe.<br>Has a 2-bit structure for each subframe. Information indicated by the two bits is as follows.<br>0b00: 1st UL subframe of each frame,<br>0b01: 2nd UL subframe of each frame,<br>0b10: 3rd UL subframe of each frame,<br>0b11: reserved.<br>Information indicated by each of the 10 bits represented by the bitmap is as follows.<br>Bit #0~1: Bits for 1st DL subframe,<br>Bit #2~3: Bits for 2nd DL subframe,<br>Bit #4~5: Bits for 3rd DL subframe,<br>Bit #6~7: Bits for 4th DL subframe,<br>Bit #8~9: Bits for 5th DL subframe. |

Table 12 is an optimized format of Table 10. Details of information included in Table 12 are identical to details of that of Table 6 among the HARQ ACK channel information structures (of Tables 1, 4, 6, and 8) included in the super-MAP.

In the case where the system transmits an HARQ ACK channel structure to terminals using a system information transfer message rather than using the super-MAP (or, SFH), the HARQ ACK channel structure as shown in Table 12 should be included in the system information transfer message. For details of this, reference can be made to Table 6.

Since the transmitting end separates and transmits information of Tables 8 and 9 from information included in Table 6, it is not necessary to separately define a structure for Table 8.

Figure 15:
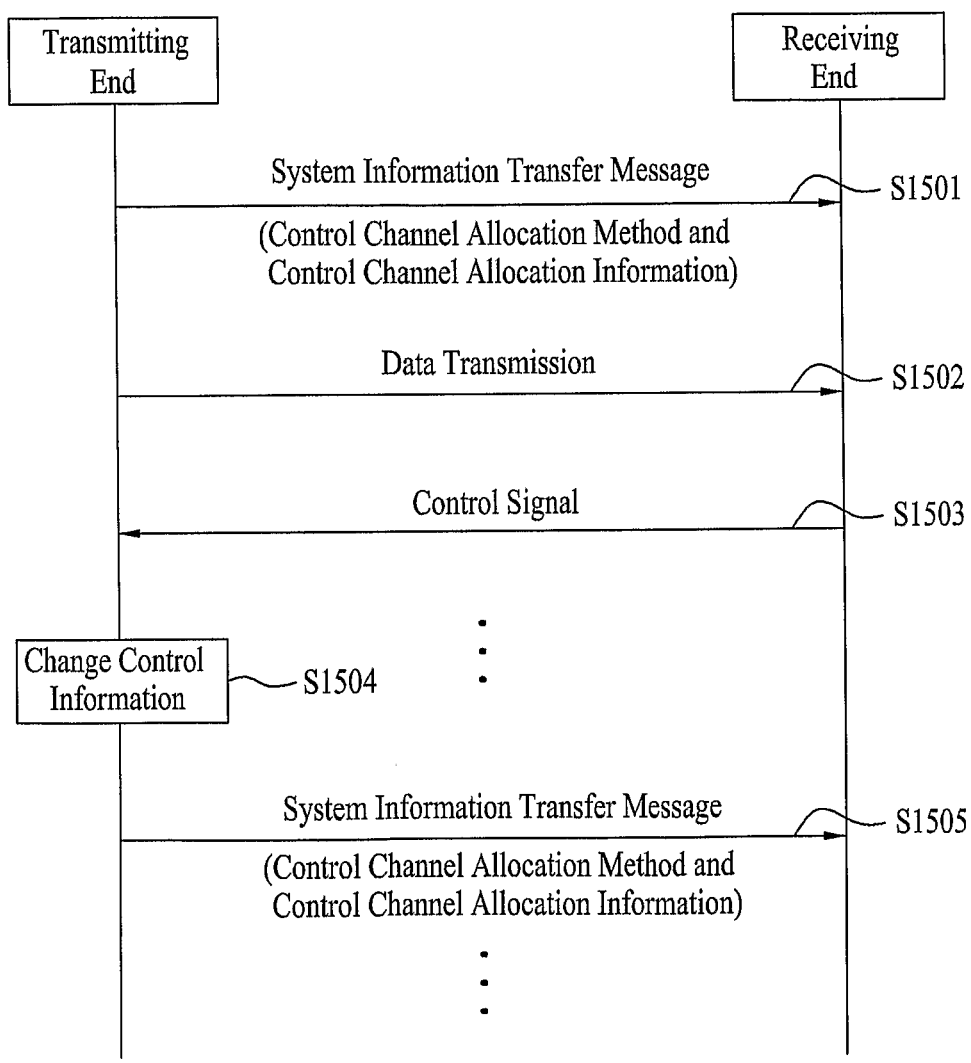
FIG. 15 illustrates a method for transmitting HARQ ACK channel location information using a system information transfer message according to another embodiment of the present invention.

FIG. 15 illustrates a method for transmitting HARQ ACK channel location information using a system information transfer message according to another embodiment of the present invention.

In the method of FIG. 15, information of one of the Tables 9, 10, and 11 can be used as the control channel allocation information. In the case where control information of Table 9 is used, a control channel allocation method (e.g. HARQ ACK/NACK allocation), together with control channel allocation information (e.g. ACKCH location information or ACKCH allocation information), may be included in the control information. In the method of FIG. 15, the control channel allocation method is set to a static allocation method) (0b00).

The transmitting end can transfer UL control channel allocation information (ACKCH location) to the receiving end by sending a system information transfer message (for example, UCD) (S1501).

At step S1501, the receiving end can identify the control channel allocation method of the transmitting end by checking an 'HARQ ACK/NACK allocation' field included in a super-MAP transmitted by the transmitting end. The receiving end can also determine the allocation location of the control channel by checking an 'ACKCH location' field. In the embodiments of the present invention, the term "control channel" refers to a logical channel used to control the system and an ACK channel (ACKCH) can be used as an example of the control channel.

The transmitting end can transmit DL data to the receiving end and the receiving end can receive the DL data using resource allocation information included in a sub-MAP (S1502).

The receiving end can transmit a control signal (ACK/NACK signal) for data or the like received from the transmitting end to the transmitting end. Here, the receiving end can use the control channel allocation information received at step S1501 in order to transmit the control signal. That is, the receiving end can transmit the control signal to the base station through a UL control channel indicated by the control channel allocation information (S1503).

Here, the control information of the transmitting end may be changed due to changes in channel environments while the transmitting end and the receiving end perform communication (S1504).

In the case where the control information has been changed, the transmitting end should transfer the changed control information to the receiving end to allow the receiving end to perform proper data transmission control. Accordingly, the transmitting end can transmit a changed super-MAP including a control channel allocation method and control channel allocation information in which the changed control information is reflected through a next system information transfer message (S1505).

The receiving end can transmit a control signal to the transmitting end using the UL control channel allocation information included in the super-MAP received at step S1505.

If control channel allocation information (HARQ ACK/NACK location) can be changed on a sub-MAP basis (i.e., using the dynamic allocation method), the transmitting end transmits changed control channel allocation information to the receiving end through inclusion in a sub-MAP of a subframe that the transmitting end desires to change. Here, information transmitted in the sub-MAP may have a structure of one of Tables 3, 5, and 7.

Reference will now be made to another method in which the transmitting end transmits control channel allocation information (for example, HARQ ACK channel timing, HARQ ACK channel allocation timing, or HARQ ACK channel allocation location) to the receiving end.

In another embodiment of the present invention, the transmitting end can transmit control channel allocation information (for example, HARQ ACK channel location) through a bitmap using a toggle method.

The following Table 13 illustrates an example structure of information used when the transmitting end notifies the receiving end of HARQ ACK channel allocation information (ACKCH location).

TABLE 13

| Name | Size | Values |
| --- | --- | --- |
| ACKCH location | TBD (default 8 bits) | Each bit is mapped one-to-one to each subframe in one frame, a bit corresponding to the current subframe is set to be equal to the previous bit if the ACK channel location of the corresponding subframe is equal to the ACK channel location of the previous subframe, and a bit corresponding to the current subframe is set to be different from the previous bit if the ACK channel location of the corresponding subframe is different from that of the previous subframe (for example, the ACK channel is located at the next subframe). |

Table 13 illustrates an example structure of information used when the transmitting end transmits the location (or timing) of an HARQ ACK channel to the receiving end. Table 13 can be transmitted through inclusion in a superframe MAP (i.e. Super Frame Header (SFH), or a superframe-based broadcast control channel) or a system information transfer message. Here, examples of the system information transfer message include a Downlink Channel Descriptor (DCD) and/or an Uplink Channel Descriptor (UCD), a System Information Block (SIB), or a Broadcast System Descriptor (BSD).

As shown in Table 13, the size of the ACK channel allocation information (ACKCH location) field is determined according to the number of subframes included in one frame. Here, it is assumed that the number of subframes included in one frame is 8 in a wireless access system (for example, IEEE 802.16m). In this case, the size of the 'ACKCH location' field can be set to 8 bits. Each bit of the 'ACKCH location' field sequentially corresponds to each subframe.

For example, the MSB indicates the first subframe in a specific frame and the LSB indicates the last subframe in the specific frame. Intermediate bits between the MSB and LSB sequentially correspond to subframes (for example, the second frame, the third frame, . . . ) between the first and last subframes.

The 'ACK channel location' field of Table 13 can indicate where the HARQ ACK channel of the subframe corresponding to each bit is located using a toggle method. For example, the transmitting end can set the bit of the first subframe to '1' (or '0'). Here, when the bit of the first UL subframe is set to '1', this can indicate that the control channels of the UL subframes are allocated to the DL subframes, starting from the first DL subframe of the next frame. In addition, when the bit of the first UL subframe is set to '0', this can indicate that the control channels of the UL subframes are allocated to the DL subframes, starting from the second DL subframe of the next frame.

On the other hand, when the bit of the first DL subframe is set to '1', this can indicate that the control channels of the DL subframes are allocated to the UL subframes, starting from the first UL subframe of the same frame. In addition, when the bit of the first DL subframe is set to '0', this can indicate that the control channels of the DL subframes are allocated to the UL subframes, starting from the second UL subframe of the same frame.

If the ACK channel location of the current subframe is the same as the ACK channel location of the immediately previous subframe, the value of the bit corresponding to the current subframe is equal to the previous bit. If the ACK channel location of the current subframe is different from that of the immediately previous subframe, the bit value will be toggled. The toggled bit value indicates that the allocation location of the ACK channel for the current DL and/or UL subframe is a frame next to a subframe to which an ACK channel corresponding to the previous subframe has been allocated.

In the embodiments of the present invention, it is assumed that an ACK channel for a DL subframe is located at a corresponding UL subframe in the same frame and an ACK channel for a UL subframe is located at a corresponding DL subframe in the next frame. In the embodiments of the present invention, it is possible to indicate not only the HARQ ACK channel location (HARQ ACK/NACK delay) of the DL subframe but also the HARQ ACK channel location of the UL subframe.

Figure 16:
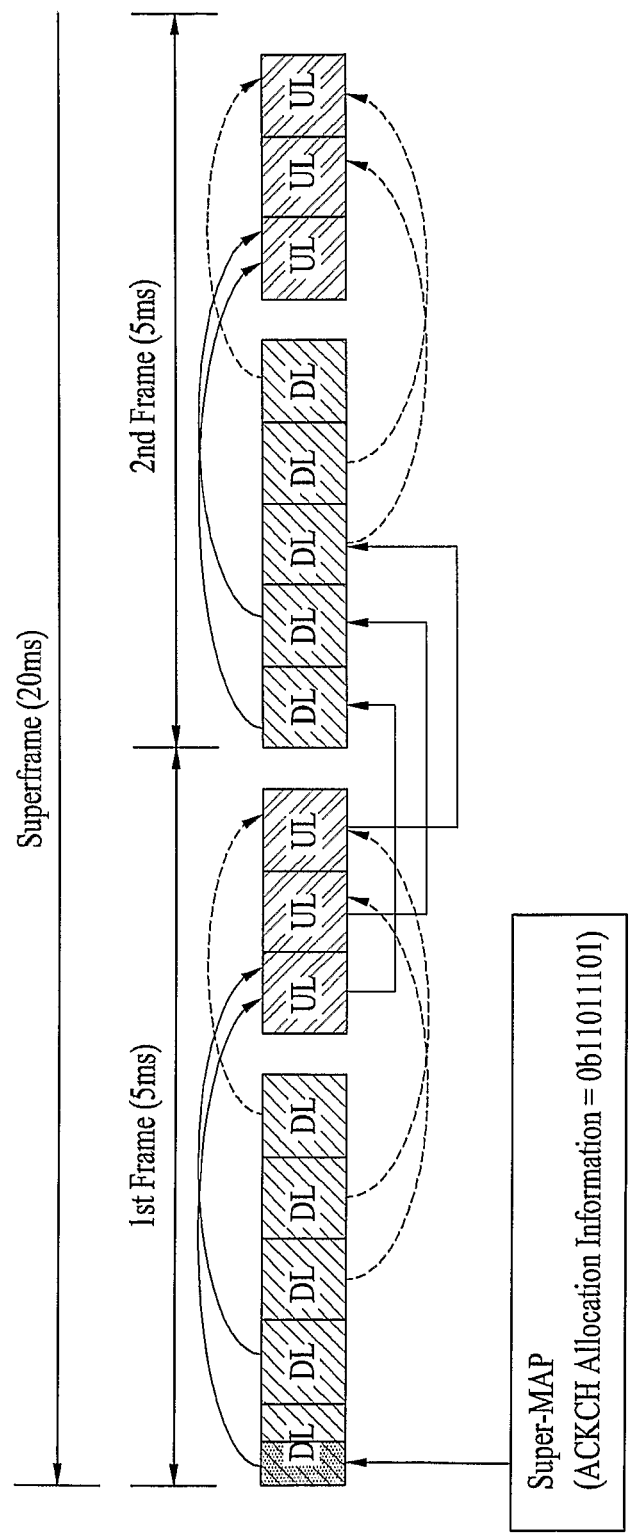
FIG. 16 illustrates an example wherein control channel allocation locations are represented using a toggle method according to another embodiment of the present invention.

FIG. 16 illustrates an example wherein control channel allocation locations are represented using a toggle method according to an embodiment of the present invention.

In the example of FIG. 16, the transmitting end transmits ACK channel location (or timing) information to the receiving end using a super-MAP (i.e., a superframe MAP). In the example of FIG. 16, the super-MAP is transmitted every superframe and is located at the beginning of the superframe to broadcast a variety of system information to each receiving end. In the embodiments of the present invention, one frame may include 5 DL subframes and 3 UL subframes. That is, one frame may include 8 subframes. Each bit included in the control channel allocation information (for example, ACKCH location) transmitted through the super-MAP is mapped to each corresponding subframe.

The bitmap can be read from the left to the right at FIG. 16 to FIG. 20. Bits from the MSB to '11011' indicate ACK channel location information of the first to fifth DL subframes and bits from the LSB to '101' indicates ACK channel location information of the first to third UL subframes. The receiving end can determine the numbers and locations of UL and DL subframes based on a DL/UL ratio value which is system information.

The receiving end can determine the allocation location of the control channel of each DL subframe using the '11011' value in the 'ACKCH location' field. The ACK channel of the first DL subframe is located at the first UL subframe of the same frame since the MSB has been set to '1'.

The ACK channel of the second DL subframe is located at the first UL subframe since the bitmap value of the second DL subframe has been set to the same bit value '1' as that of the MSB. The bitmap value of the third DL subframe has been set to '0'. Accordingly, the third bit has been toggled from the second bit and therefore the ACK channel of the third DL subframe is located at the second UL subframe.

Since the bitmap value of the fourth DL subframe has been set to '1', the corresponding bit has been toggled from the previous bit so that the ACK channel of the fourth DL subframe is allocated to a subframe subsequent to the UL subframe to which the ACK channel of the third DL subframe has been allocated. That is, the ACK channel of the fourth DL subframe is located at the third UL subframe. The bit value of the fifth DL subframe has been set to '1'. Accordingly, the fifth bit value is equal to the fourth bit value and therefore the ACK channel of the fifth DL subframe is allocated to the UL subframe to which the ACK channel of the fourth DL subframe has been allocated. Thus, the receiving end can determine that the ACK channel of the last DL subframe is located at the third UL subframe.

The receiving end can read values (101) set for UL subframes from a bitmap included in the ACK channel allocation information (ACKCH location) included in the super-MAP. That is, the receiving end can determine that the ACK channel of the first UL subframe is located at the first DL subframe of the next frame. The value for the second UL subframe is set to '0'. Accordingly, the second bit has been toggled from the first bit and therefore the ACK channel of the first UL subframe is allocated to the second DL subframe. The value for the third UL subframe is set to '1'. Accordingly, since the third bit has been toggled from the second bit, the receiving end can determine that the ACK channel of the third UL subframe is located at the third DL subframe.

In the example of FIG. 16, the number of DL subframes in a specific frame is set to 5 and the number of UL subframes is set to 3 (i.e., DL/UL ratio=5:3). However, the same or similar method can be applied when a DL/UL ratio different from 5:3 has been set. Each value transmitted through the super-MAP (or another system information transfer channel (or message)) can be equally applied to every frame until the value is changed.

Figure 17:
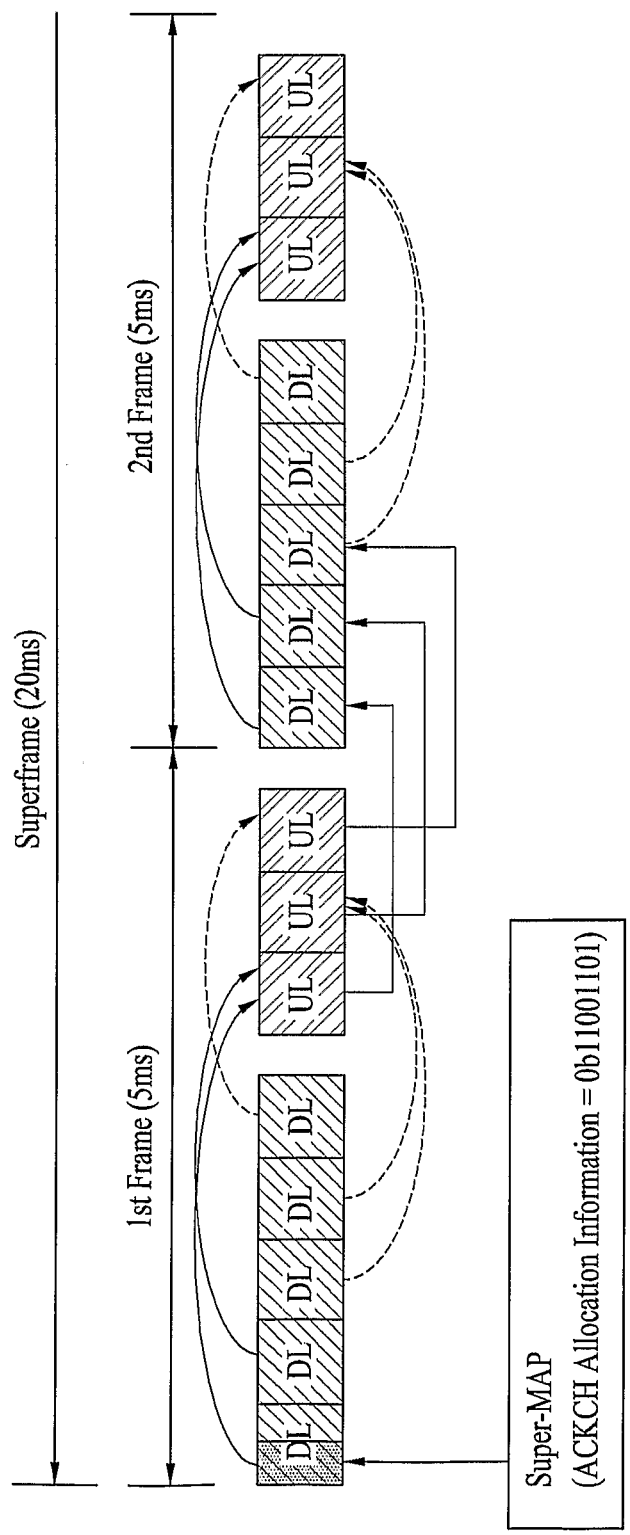
FIG. 17 illustrates another example wherein control channel allocation locations are represented using a toggle method according to another embodiment of the present invention.

FIG. 17 illustrates another example wherein control channel allocation locations are represented using a toggle method according to an embodiment of the present invention.

The method for allocating a control channel for each DL subframe illustrated in FIG. 17 is similar to that of FIG. 16. However, ACK channel allocation information included in the super-MAP is '0b11001101'. When the receiving end receives the ACK channel allocation information, the receiving end can determine where a control channel of each subframe is allocated.

That is, ACK channels of the first and second DL subframes are located at the first UL subframe of the same frame, ACK channels of the third and fourth DL subframes are located at the second UL subframe of the same frame, and an ACK channel of the fifth DL subframe is located at the third UL subframe of the same frame. In addition, the allocation location of each UL subframe is equal to that of FIG. 16.

The above method has been described with reference to an example wherein the start value of the bitmap of the first DL (or UL) subframe is set to '1' so that the ACK channel of each subframe is allocated to the first UL (or DL) subframe. The following is a description of a method for controlling the start location of subframes to which control channels of UL (or DL) subframes are allocated.

For example, it is assumed that, if the ACK channel location bit of the first UL subframe is set to '1', this indicates that the ACK channel of the first UL subframe is located at the first DL subframe of the next frame. It is also assumed that, if the ACK channel location bit of the first UL subframe is set to '0', this indicates that the ACK channel of the first UL subframe is located at the second DL subframe of the next frame.

In addition, if the ACK channel location bit of the first DL subframe is set to '1', this indicates that the ACK channel of the first DL subframe is located at the first UL subframe of the current frame. If the ACK channel location bit of the first DL subframe is set to '0', this indicates that the ACK channel of the first DL subframe is located at the second UL subframe of the current frame.

Figure 18:
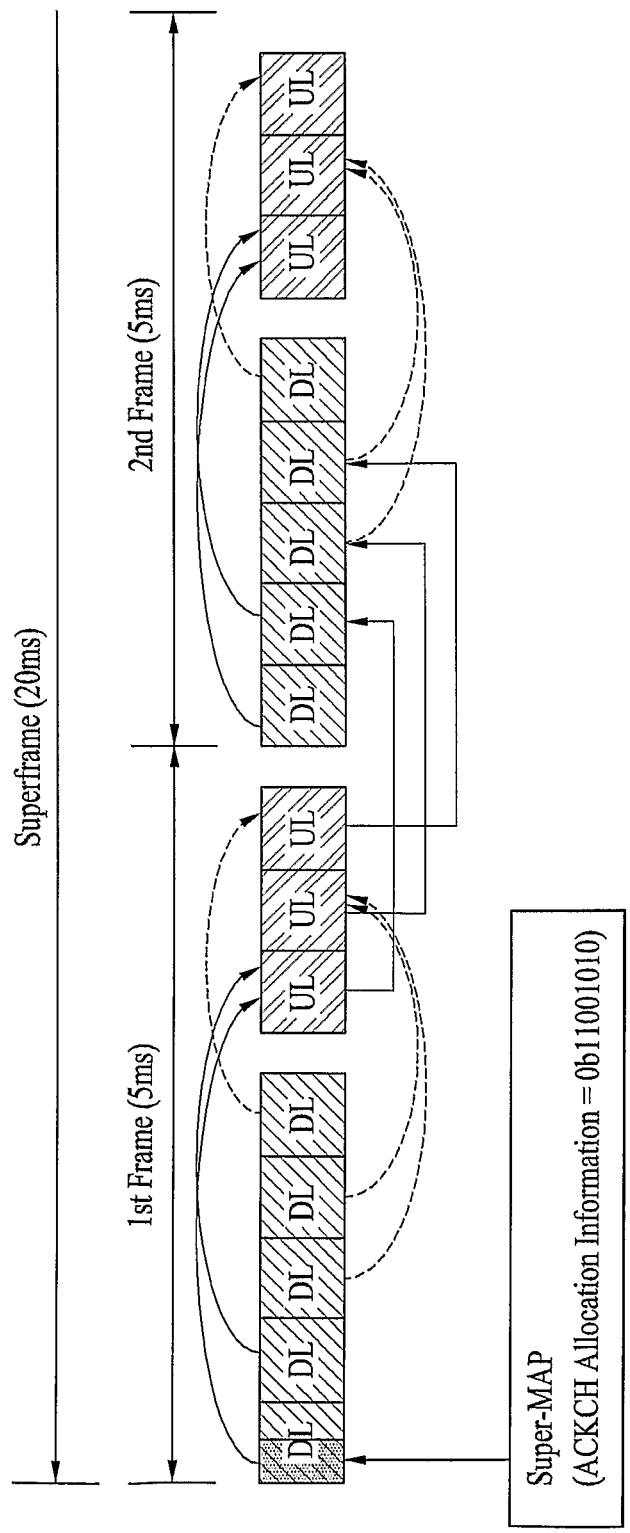
FIG. 18 illustrates another example wherein control channel allocation locations are represented using a toggle method according to another embodiment of the present invention.

FIG. 18 illustrates another example wherein control channel allocation locations are represented using a toggle method according to an embodiment of the present invention.

The ACK channel allocation for the DL subframe in FIG. 18 is similar to that of FIG. 17. Here, it can be seen that information (ACKCH location=0b11001/010) of ACK channel locations of UL subframes included in the super-MAP has been set to '010'. Here, since the first bit has been set to '0', the ACK channel of the first UL subframe is located at the second DL subframe of the second frame.

In addition, the second bit has been set to '1' and the third bit has been set to '0'. Accordingly, the second bit has been toggled from the first bit so that the ACK channel of the second UL subframe is located at the third DL subframe of the second frame and the third bit has been toggled from the second bit so that the ACK channel of the third UL subframe is located at the fourth DL subframe of the next frame.

Figure 19:
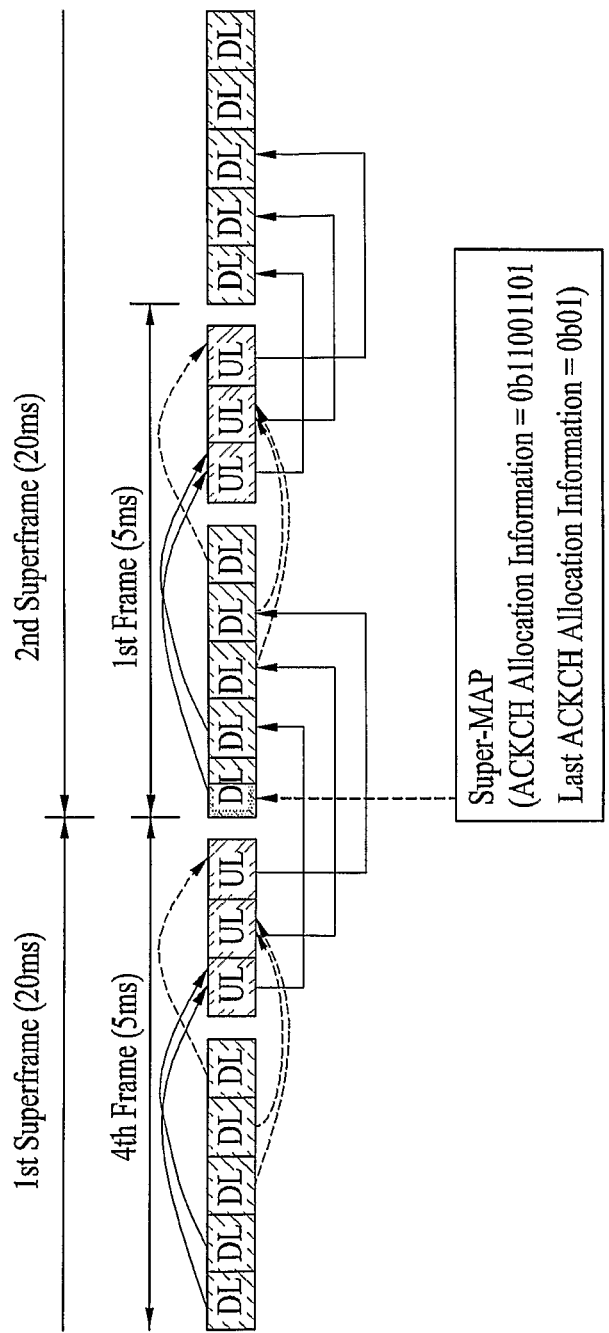
FIG. 19 illustrates another example wherein control channel allocation locations are represented using a toggle method according to another embodiment of the present invention.

FIG. 19 illustrates another example wherein control channel allocation locations are represented using a toggle method according to an embodiment of the present invention.

Generally, the ACK channel of the first UL subframe can be located at the first DL subframe of the next frame. However, since a superframe header is located at the first subframe of the first frame in the superframe, the ACK channel of the UL subframe of the last frame may sometimes not be located at the first subframe of the next frame. The following is a control method to overcome this problem.

FIG. 19 illustrates the case where the ACK channel of the first UL subframe included in the last frame (the fourth frame) of the first superframe is located at the second DL subframe of the next (i.e., second) superframe. That is, FIG. 19 illustrates a control channel allocation method in the case where an HARQ ACK channel cannot be located at the first DL subframe of the second superframe while a super-MAP (or superframe header) is located at the first DL subframe of the second superframe.

In the method of FIG. 19, the transmitting end can notify the receiving end of control channel allocation locations (for example, ACK channel allocation information) using a super-MAP or a system information transfer message. In this case, the transmitting end can notify the receiving end of a fixed location of allocation of a control channel of the first UL subframe of the fourth frame. For example, the transmitting end can transmit ACK channel allocation information of the fourth frame (ACKCH location of last frame) to the receiving end by additionally incorporating the information into the super-MAP.

The following Table 14 illustrates an example of information (ACKCH location of last frame) representing allocation locations of UL subframes in the last frame included in the super-MAP.

TABLE 14

| Name | Size | Values |
| --- | --- | --- |
| ACKCH location of last frame | 2 bits | Indicates HARQ ACK channel allocation location of UL subframe. |

TABLE 14-continued

| Name | Size | Values |
| --- | --- | --- |
| | | 0b00: Indicates the 1st DL subframe of the next frame. |
| | | 0b01: Indicates the 2nd DL subframe of the next frame. |
| | | 0b10: Indicates the 3rd DL subframe of the next frame. |
| | | 0b11: Indicates the 4th DL subframe of the next frame. |

As shown in Table 14, when the ACK channel allocation information (ACKCH location) of the last frame is '0b00', this indicates that the ACK channel of the first UL subframe of the last frame has been fixedly allocated to the first DL subframe included in the second superframe. When the ACK channel allocation information of the last frame is '0b01', this indicates that the ACK channel of the first UL subframe of the last frame has been fixedly allocated to the second DL subframe included in the second superframe. When the ACK channel allocation information of the last frame is '0b10', this indicates that the ACK channel of the first UL subframe of the last frame has been fixedly allocated to the third DL subframe included in the second superframe. When the ACK channel allocation information of the last frame is '0b11', this indicates that the ACK channel of the first UL subframe of the last frame has been fixedly allocated to the fourth DL subframe included in the second superframe.

When the receiving end receives ACK channel allocation information (ACKCH location) of the last frame through a super-MAP, the receiving end can determine the start location of allocation of the ACK channel of the first UL subframe of the last frame. Accordingly, the receiving end can determine the allocation locations of ACK channels of the second and third UL subframes using the ACK channel allocation information included in the super-MAP.

As shown in FIG. 19, the transmitting end transmits a super-MAP of the first superframe to the receiving end in order to allocate control channels to the receiving end. The super-MAP may include ACK channel allocation information (ACKCH location) and last ACK channel allocation information (ACKCH location of last frame) indicating the allocation locations of UL subframes of the last frame.

In this case, a bitmap indicating the ACK channel allocation information is '0b11001/101' and a bitmap indicating the last ACK channel allocation information is '0b01'. That is, the allocation location of the control channel of each subframe is equal to that of FIG. 17. However, the allocation location of the ACK channel of the first UL subframe of the last frame included in the first superframe is different from those of other frames. It can be seen from FIG. 19 that the ACK channel of the first UL subframe of the last frame is allocated to the second DL subframe of the first frame of the second superframe.

The transmitting end can transmit HARQ ACK channel location information of the first UL subframe of the last frame to the receiving end by additionally incorporating the information into a super-MAP or a system information transfer message.

The following Table 15 illustrates information (ACKCH location of last frame) indicating the ACK channel allocation location of the first UL subframe of the last frame included in the super-MAP or the system information transfer message.

TABLE 15

| Name | Size | Values |
|---|---|---|
| ACKCH location of last frame | 2 bits | Indicates HARQ ACK channel location of the first UL subframe of the last frame.<br>0b0: Indicates the 2nd DL subframe of the next frame.<br>0b1: Indicates the 3rd DL subframe of the next frame. |

As shown in Table 15, when the ACK channel allocation information (ACKCH location) of the last frame is '0b0', this indicates that the ACK channel of the first UL subframe of the last frame has been allocated to the second DL subframe of the first frame included in the second superframe. When the ACK channel allocation information of the last frame is '0b1', this indicates that the ACK channel of the first UL subframe of the last frame has been allocated to the third DL subframe.

Tables 14 and 15 illustrate the case where the start location of the ACK channel of the first UL subframe of the last frame is fixed (at the second DL subframe of the next frame in the above example). In this case, although flexibility of system application is reduced, there is no need to transmit additional information regarding ACK channel location (or timing) allocation (or change).

Figure 20:
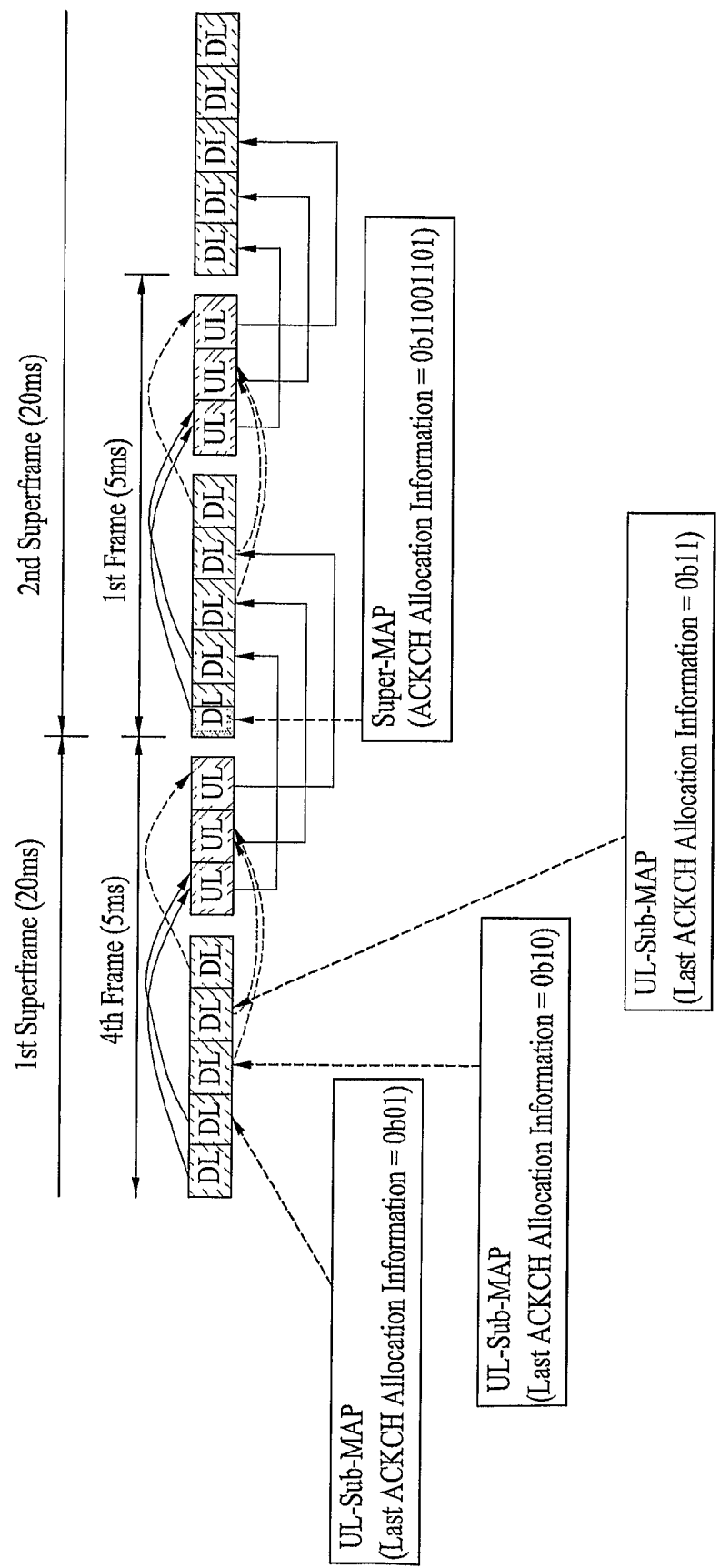
FIG. 20 illustrates another example wherein control channel allocation locations are represented using a toggle method according to another embodiment of the present invention.

FIG. 20 illustrates another example wherein control channel allocation locations are represented using a toggle method according to an embodiment of the present invention.

In the example of FIG. 20, the ACK channels of the UL subframes included in the last frame of the first superframe are allocated to the DL subframes, starting from the second DL subframe included in the first frame of the next (i.e., second) superframe. In the example of FIG. 20, the HARQ ACK channel cannot be located at the first subframe of the second superframe since the second super-MAP (or superframe header) is located at the first subframe of the second superframe. However, depending on the size of the super-MAP, a control channel of a UL subframe of the previous superframe may be allocated to a DL subframe to which the super-MAP has been allocated.

In the example of FIG. 20, the transmitting end can allocate ACK channel location information of UL subframes included in the last frame of the first superframe to the receiving end using a UL sub-MAP.

The following Table 16 illustrates an example of last ACK channel allocation information (ACKCH location of the last frame) for notifying the receiving end of the allocation locations of ACK channels of UL subframes of the last frame.

TABLE 16

| Name | Size | Values |
|---|---|---|
| ACKCH location of last frame | 2 bits | Indicates HARQ ACK channel allocation location of UL subframe.<br>0b00: Indicates the 1st DL subframe of the next frame.<br>0b01: Indicates the 2nd DL subframe of the next frame.<br>0b10: Indicates the 3rd DL subframe of the next frame.<br>0b11: Indicates the 4th DL subframe of the next frame. |

In Table 16, '0b00' indicates the first DL subframe included in the first frame of the second super-MAP, '0b01' indicates the second DL subframe included in the first frame of the second super-MAP, '0b10' indicates the third DL subframe included in the first frame of the second super-MAP, and '0b11' indicates the fourth DL subframe included in the first frame of the second super-MAP.

The following is a description of the method of FIG. 20 with reference to Table 16. That is, the receiving end can determine the allocation locations of ACK channels of UL subchannels in the last frame of the first superframe. That is, the receiving end can determine ACK channel allocation information of subframes included in the first to third frames using ACK channel allocation information (ACKCH location) included in the super-MAP. However, the transmitting end can allocate control channels of UL subframes included in the last frame (the fourth frame) using a UL sub-MAP. That is, the last ACK channel allocation information (ACKCH location of last frame) of Table 16 can be included in the UL sub-MAP.

In the example of FIG. 20, the transmitting end transmits the UL sub-MAP in the second, third, and fourth DL subframes in the fourth frame of the first superframe. The transmitting end can incorporate last ACK channel allocation information (ACKCH location of last frame) to the UL sub-MAP. Accordingly, the receiving end can identify an ACK channel allocated to each UL subframe by checking the last ACK channel allocation information included in each UL sub-MAP.

According to the spirit of the present invention as described above, the transmitting end and the receiving end can perform correct ACK control during data communication.

The following is another method using Table 13 described above.

In the method of Table 13 described above, it is assumed that, if the location bit of the ACK channel of the first UL subframe has been set to '1', the ACK channel of the first UL subframe is located at the first DL subframe of the next frame.

It is also assumed that, if the location bit of the ACK channel of the first UL subframe has been set to '0', the ACK channel of the first UL subframe is located at the second DL subframe of the next frame. In addition, if the location bit of the ACK channel of the first DL subframe has been set to '1', this indicates that the ACK channel of the first DL subframe is located at the first UL subframe of the current frame.

If the location bit of the ACK channel of the first DL subframe has been set to '0', this indicates that the ACK channel of the first DL subframe is located at the second UL subframe of the current frame.

In another method, if the bit of the first UL subframe has been set to '1', this indicates that the control channels (HARQ ACK channels) of UL subframes are allocated to DL subframes, starting from the first DL subframe of the next frame and, if the bit of the first UL subframe has been set to '0', this indicates that the control channels (HARQ ACK channels) of the UL subframes are not allocated. This method is useful when control channels (HARQ ACK channels) are used only for DL subframes such that the control channels of the DL subframes are allocated to UL subframes while control channels are not used for UL subframes. In this case, bits of UL subframes are all set to '0'. This method can be applied in the same or similar manner to DL subframes.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. It will be apparent that claims which are not explicitly dependent on each other can be combined to provide an embodiment or new claims can be added through amendment after this application is filed.

INDUSTRIAL APPLICABILITY

The embodiments of the present invention can be applied to a variety of wireless access systems. Examples of the wireless access systems include 3rd Generation Partnership Project (3GPP), 3GPP2, and/or Institute of Electrical and Electronic Engineers (IEEE) 802.xx systems. The embodiments of the present invention can be applied not only to the variety of wireless access systems but also to all technical fields to which the variety of wireless access systems are applied.

The invention claimed is:

1. A method for allocating feedback channels in a wireless access system, the method performed by a base station and comprising:
   transmitting a super-MAP through beginning of a super-frame including a plurality of frames, the super-MAP including feedback channel allocation information indicating where a feedback channel is allocated in the super-frame;
   transmitting downlink data through the super-frame; and
   receiving feedback data for the downlink data through an uplink subframe indicated by the feedback channel allocation information,
   wherein the feedback channel allocation information includes:
   frame information indicating whether the feedback channel is located at a current frame at which the downlink data is transmitted or a next frame of the current frame, and
   subframe information indicating a position of the feedback channel in a plurality of uplink subframes of the current frame or the next frame.

2. The method according to claim 1, further comprising:
   transmitting a frame-MAP including change information related to a changed feedback channel,
   wherein the change information includes:
   change scope information indicating whether the change information is applied only to a frame at which the frame-MAP is transmitted on all frames of the super-frame, and
   mode information indicating that the change information is configured by a bitmap mode or a non-bitmap mode.

3. The method according to claim 2, the change information further includes:
   locations of all feedback channels in the frame at which the frame-MAP is transmitted, when the mode information indicated the bitmap mode or,
   a position of a downlink subframe at which the downlink data is transmitted and a position of the changed feedback channel, which the mode information indicated the non-bitmap mode.

4. The method according to claim 1, further comprising:
   transmitting, when the feedback channel allocation information is changed, a sub-MAP including changed feedback channel allocation information and scope information indicating a frame scope in which the changed feedback channel allocation information is maintained to the receiving end,
   wherein the feedback channel allocation information is changed on a frame basis.

5. The method according to claim 4, wherein the changed feedback channel allocation information includes information of a frame at which a changed feedback channel is located and information of an uplink subframe at which a changed feedback channel is located.

6. The method according to claim 4, wherein the changed control feedback allocation information includes:
   an identifier of a downlink subframe at which the feedback channel has been changed;
   information of a frame at which the changed feedback channel for the downlink subframe is located; and
   information of an uplink subframe at which the changed feedback channel is located.

7. The method according to claim 1, further comprising:
   transmitting, when the feedback channel allocation information is changed, a sub-MAP including changed feedback channel allocation information and scope information indicating a subframe scope in which the changed feedback channel allocation information is maintained to the receiving end,
   wherein the feedback channel allocation information is changed on a subframe basis.

8. The method according to claim 7, wherein the changed feedback channel allocation information includes information of a frame at which a changed feedback channel is located and information of an uplink subframe at which a changed feedback channel is located.

9. The method according to claim 8, wherein the information of the frame at which the changed feedback channel is located is effective in a frame in which the sub-MAP has been transmitted.

10. The method according to claim 1, wherein each of the plurality of frames includes N downlink subframes and M uplink subframes, where N and M are positive integer numbers and different from each other.

11. A method for allocating feedback channels in a wireless access system, the method performed by a mobile station and comprising:
    receiving a super-MAP through beginning a super-frame including two or more frames, the super-MAP including feedback channel allocation information indicating where a feedback channel is allocated in the super-frame;
    receiving downlink data through the super-frame;
    transmitting feedback data for the downlink data through an uplink subframe indicated by the feedback channel allocation information,
    wherein the feedback channel allocation information includes:
    frame information indicating whether feedback channel is located at a current frame at which the downlink data is transmitted or a next frame of the current frame, and
    subframe information indicating a position of the feedback channel in a plurality of uplink subframes included in the current frame or the next frame.

12. The method according to claim 11, further comprising:
    receiving a frame-MAP including change information indicating the feedback channel is changed,
    wherein the change information includes:
    change scope information indicating whether the change information is applied only to a frame at which the frame-MAP is transmitted or all frames of the super-frame, and
    mode information indicating that the change information is configured by a bitmap mode or a non-bitmap mode.

13. The method according to claim 12, the change information further includes:

if the mode information indicated the bitmap mode, bitmap location information indicating locations of all feedback channels in the frame including the frame-MAP, and if the mode information indicated the non-bitmap mode, subchannel information indicated which downlink subframe is related to the changed feedback channel and non-bitmap location information indicating location of the changed feedback channel.

14. The method according to claim 11, further comprising:
receiving a sub-MAP including changed feedback channel allocation information and scope information indicating a subframe scope in which the changed feedback channel allocation information is maintained to the receiving end, wherein the sub-MAP is received on a subframe basis.

15. A method for allocating feedback channels in a wireless access system, the method performed by a base station and comprising:

transmitting a first system information transfer message through beginning of a super-frame including a plurality of frames, the first system information transfer message including feedback channel allocation information indicated where a feedback channel is allocated in the super-frame transmitting downlink data through the super-frame; and receiving feedback data through an uplink subframe indicated by the feedback channel allocation information, wherein the feedback channel allocation information includes:

frame information indicated whether the feedback channel is located at a current frame at which the downlink data is transmitted or a next frame of the current frame, and subframe information indicating a position of the feedback channel in a plurality of uplink subframes of the current frame or the next frame.

16. The method according to claim 15, further comprising:
transmitting, when the feedback channel allocation information is changed, a second system information transfer message including changed feedback channel allocation information and a changed feedback channel allocation method to the receiving end.

17. The method according to claim 15, further comprising:
transmitting, when the feedback channel allocation information is changed, one of a super-MAP including changed feedback channel allocation information, a sub-MAP including changed feedback channel allocation information and scope information indicating a frame scope in which the changed feedback channel allocation information is maintained, and a sub-MAP including changed feedback channel allocation information and scope information indicating a subframe scope in which the changed feedback channel allocation information is maintained to the receiving end.

18. A method for allocating feedback channels in a wireless access system, the method performed by a mobile station and comprising:

receiving a super-MAP through beginning of a super-frame including a plurality of frames, the super-MAP including a feedback channel allocation information indicated where a feedback channel is allocated at the super-frame, and transmitting a feedback signal related to a downlink subframe through an uplink subframe indicated by the feedback channel allocation information, wherein the feedback channel allocation information includes a toggling bitmap indicating that each bit of the toggling bitmap is mapped to each downlink subframe of the plurality of frames, and wherein the each bit of the toggling bitmap is toggled when a feedback channel location of a corresponding subframe is different from a feedback channel location of a previous subframe.

19. The method according to claim 18, wherein the super-MAP further includes information of allocation of the feedback channel of an uplink subframe included in a last frame of each superframe.

20. The method according to claim 18, further comprising:
transmitting an uplink sub-MAP, which further includes information of allocation of the feedback channel of an uplink subframe included in a last frame of each superframe, to the receiving end.

* * * * *